(12) United States Patent
Kabune

(10) Patent No.: US 11,370,373 B2
(45) Date of Patent: Jun. 28, 2022

(54) POWER SOURCE SYSTEM

(71) Applicant: DENSO CORPORATION, Kariya (JP)

(72) Inventor: Hideki Kabune, Kariya (JP)

(73) Assignee: DENSO CORPORATION, Kariya (JP)

( * ) Notice: Subject to any disclaimer, the term of this patent is extended or adjusted under 35 U.S.C. 154(b) by 43 days.

(21) Appl. No.: 16/900,676

(22) Filed: Jun. 12, 2020

(65) Prior Publication Data

US 2020/0391681 A1  Dec. 17, 2020

(30) Foreign Application Priority Data

Jun. 14, 2019  (JP) .............................. JP2019-110937

(51) Int. Cl.
*B60R 16/03* (2006.01)
*H02M 7/537* (2006.01)
*B62D 5/04* (2006.01)

(52) U.S. Cl.
CPC ................ *B60R 16/03* (2013.01); *B62D 5/04* (2013.01); *H02M 7/537* (2013.01)

(58) Field of Classification Search
None
See application file for complete search history.

(56) References Cited

U.S. PATENT DOCUMENTS

| 2017/0272009 A1* | 9/2017 | Kawamura | B60L 3/12 |
| 2019/0276071 A1* | 9/2019 | Nagashima | H02P 25/16 |
| 2019/0291778 A1* | 9/2019 | Nagashima | H02K 7/14 |
| 2020/0055542 A1* | 2/2020 | Yamamoto | B62D 5/0481 |
| 2021/0046973 A1* | 2/2021 | Koseki | B62D 5/0403 |

FOREIGN PATENT DOCUMENTS

| DE | 102015104850 A1 | 10/2016 |
| DE | 102016102248 A1 | 8/2017 |
| JP | 2018042403 A | 3/2018 |

* cited by examiner

*Primary Examiner* — Rexford N Barnie
*Assistant Examiner* — Terrence R Willoughby
(74) *Attorney, Agent, or Firm* — Maschoff Brennan

(57) ABSTRACT

In a power source system, circuit units by the number of systems n or more are respectively connected correspondingly to power sources by the number of n (n is an integer of 2 or more). A common ground is all of the circuit units in common. A ground wiring portion establish node-to-node connection between (n+α) pieces of common ground nodes NC(1) to NC(n+α) provided in the common ground and (n+α) pieces of ground plane nodes NP(1) to NP(n+α) provided on a vehicle body in an independent manner, thereby enabling a simple configuration of redundant circuits that can withstand multipoint failures without separating the ground for each system.

5 Claims, 19 Drawing Sheets

POWER SOURCE SYSTEM

CROSS REFERENCE TO RELATED APPLICATION

The present application is based on and claims the benefit of priority of Japanese Patent Application No. 2019-110937, filed on Jun. 14, 2019, the disclosure of which is incorporated herein by reference.

TECHNICAL FIELD

The present disclosure relates to a power source system.

BACKGROUND INFORMATION

The related art includes a motor control device in which an external power source is made redundant. For example, in the related art, two separate external power sources are connected to two ECUs (i.e., electronic control units) via separate power ground lines, respectively, and the configuration of the external power source is made redundant along with the configuration of a motor control system.

If a ground is separately provided for each system, i.e., system to system, as in the related art, a ground disconnection detection circuit, a current limit circuit for preventing a ground current from flowing from an abnormal system to a normal system when the ground is disconnected, and the like are required, which complicates the circuit configuration.

SUMMARY

It is an object of the present disclosure to provide a power source system capable of simplifying a circuit configuration.

DETAILED DESCRIPTION

First Embodiment

Hereinafter, a power source system according to the present disclosure is described with reference to the drawings. In a plurality of embodiments described below, a substantially identical component is designated by the same reference number to eliminate duplicated description.

Figure 1:
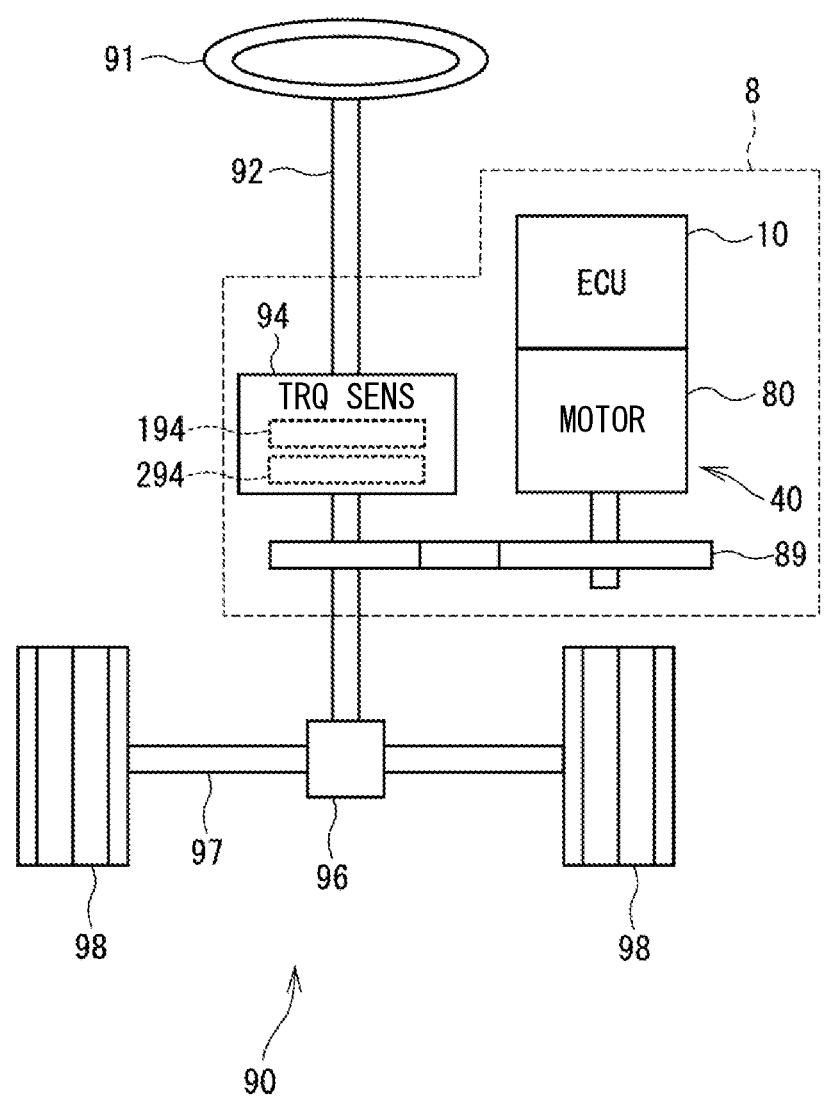
FIG. 1 is a schematic structural diagram of a steering system including a driving device according to a first embodiment.

The first embodiment is illustrated in FIGS. 1 to 11. A power source system 1 (see FIG. 10) is applied to, for example, an electric power steering device 8 for assisting a steering operation of a vehicle. FIG. 1 shows a configuration of a steering system 90 including the electric power steering device 8. The steering system 90 includes a steering wheel 91 which is a steering member, a steering shaft 92, a pinion gear 96, a rack shaft 97, road wheels 98, the electric power steering device 8 and the like.

The steering wheel 91 is connected to the steering shaft 92. A torque sensor 94 is provided on the steering shaft 92 to detect a steering torque. The torque sensor 94 has a first sensor unit 194 and a second sensor unit 294, which makes a redundant configuration in which each of the sensor units is capable of detecting its own failure. The pinion gear 96 is provided at an axial end of the steering shaft 92. The pinion gear 96 engages with the rack shaft 97. A pair of road wheels 98 is coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a translational movement of the rack shaft 97 by the pinion gear 96. The pair of road wheels 98 is steered to an angle corresponding to a displacement amount of the rack shaft 97.

The electric power steering device 8 includes a drive device 40, a speed reduction gear 89, and the like. The drive device 40 includes a motor 80, an ECU 10, and the like. The speed reduction gear 89 serving as a power transmission unit reduces the rotation speed of the motor 80 and transmits the rotation to the steering shaft 92. The electric power steering device 8 of the present embodiment is a column-assist type, conveying the rotation to a steering column in the steering shaft 92. However, it may alternatively be a rack-assist type that transmits the rotation of the motor 80 to the rack shaft 97. In the present embodiment, the steering shaft 92 corresponds to a "drive object."

Figure 2:
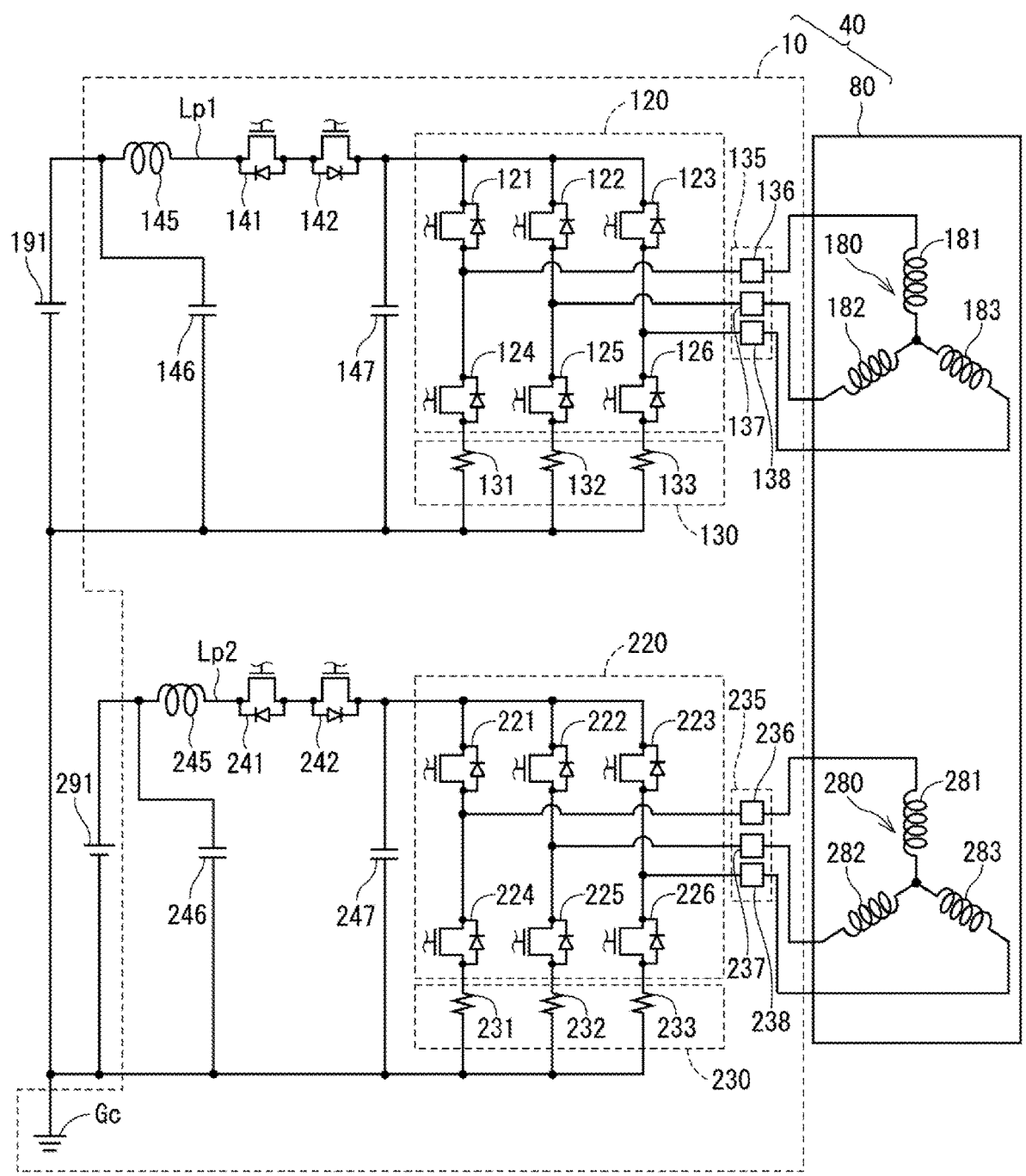
FIG. 2 is a circuit diagram of a drive device according to the first embodiment.

Next, the electrical configuration of the drive device 40 is described with reference to FIG. 2. The motor 80 outputs part or all of the torque required for steering, and is driven by electric power supplied from batteries 191 and 291 as power sources, and rotates the speed reduction gear 89 forward and backward. The motor 80 is a three-phase brushless motor, but may also be a motor other than the three-phase brushless motor.

The motor 80 has a first motor winding 180 and a second motor winding 280 as a winding set. The motor windings 180 and 280 have the same electrical characteristics, and are cancel-wound around a common stator 840 (see FIG. 4) with a shift of an electric angle of 30 [deg] from each other. Correspondingly, phase currents are controlled to be supplied to the motor windings 180 and 280 such that the phase currents have a phase difference φ of 30 degrees. By optimizing a current supply phase difference, the output torque is improved. In addition, sixth-order torque ripple can be reduced, and noise and vibration accompanied therewith can thus be reduced. In addition, since heat is distributed and leveled by the distribution of the current among the systems, it is possible to reduce temperature-dependent system errors such as a detection value of each sensor and a torque, as well as increasing the amount of suppliable electric current. The motor windings 180 and 280 do not have to be cancel-wound, and may have respectively different electrical characteristics.

Hereinafter, a combination of a first inverter 120 and a first microcomputer 150 with other components related to the energization control (i.e., power supply control) of the first motor winding 180 is referred to as a first system L1, and a combination of a second inverter 220 and a second microcomputer 250 with other components related to the energization control of the second motor winding 280 is referred to as a second system L2. Further, the configuration related to the first system L1 is basically indicated with reference numbers of 100s, and the configuration related to the second system L2 is basically indicated with reference numbers of 200s. Further, in the first system L1 and the second system L2, the same or similar configuration is numbered so that the last 2 digits are the same number, and the description regarding the configuration of the second system L2, etc. is suitably omitted. For the other configuration described below, the term "first" is indicated with a suffix "1," and the term "second" is indicated with a suffix "2."

The first inverter 120 is connected to the first motor winding 180, and electric power is supplied from the first battery 191 via the first inverter 120. The first inverter 120 converts the electric power for the first motor winding 180, and has six switching elements 121 to 126. Although the switching elements 121 to 126 of the present embodiment are MOSFETs, the switching elements may also be IGBTs, thyristors, or the like, and the same applies to motor relays 136 to 138 and power source relays 141 and 142 described later.

The switching elements 121 to 123 are positioned on a high-potential side, and the switching elements 124 to 126 are positioned on a low-potential side. One end of a U-phase coil 181 is connected to a connection point of the U-phase switching elements 121 and 124 to be paired, and one end of a V-phase coil 182 is connected to a connection point of the V-phase switching elements 122 and 125 to be paired, and one end of a W-phase coil 183 is connected to a connection point of the W-phase switching elements 123 and 126 to be paired.

A first current detector 130 is provided on a low-potential side of the first inverter 120. The first current detector 130 includes current detection elements 131 to 133 provided in each phase. The current detection elements 131 to 133 of the present embodiment are shunt resistors, but may also be Hall elements, and the position of the detector may also be on the high-potential side or on a load side (i.e., on a side close to the first motor winding 180).

A motor relay unit 135 is provided at a position between the first inverter 120 and the first motor winding 180, and the connection/disconnection between the switching elements 121 to 126 and the coils 181 to 183 can be switched. Specifically, a motor relay 136 is provided at a position between the U-phase switching elements 121 and 124 and the U-phase coil 181, and a motor relay 137 is provided at a position between the V-phase switching elements 122 and 125 and the V-phase coil 182, and a motor relay 138 is provided at a position between the W-phase switching elements 123 and 126 and the W-phase coil 183. The motor relays 136 to 138 may be mechanical relays or may be semiconductor relays (for example, MOSFETs). Further, if a regenerative brake mode is allowed in the system at the time of failure, the motor relay may be omitted.

The power source relays 141 and 142 are provided on a high-potential side wiring Lp1 that connects a positive electrode of the first battery 191 and a high-potential side of the first inverter 120. When the power source relays 141 and 142 are configured by elements having parasitic diodes such as MOSFETs, it is desirable to connect the two elements in series so that the directions of the parasitic diodes are reversed. In such manner, it is possible to prevent a reverse current from flowing when the battery 191 is erroneously connected in the reverse direction. The power source relays 141 and 142 may be mechanical relays.

Figure 3:
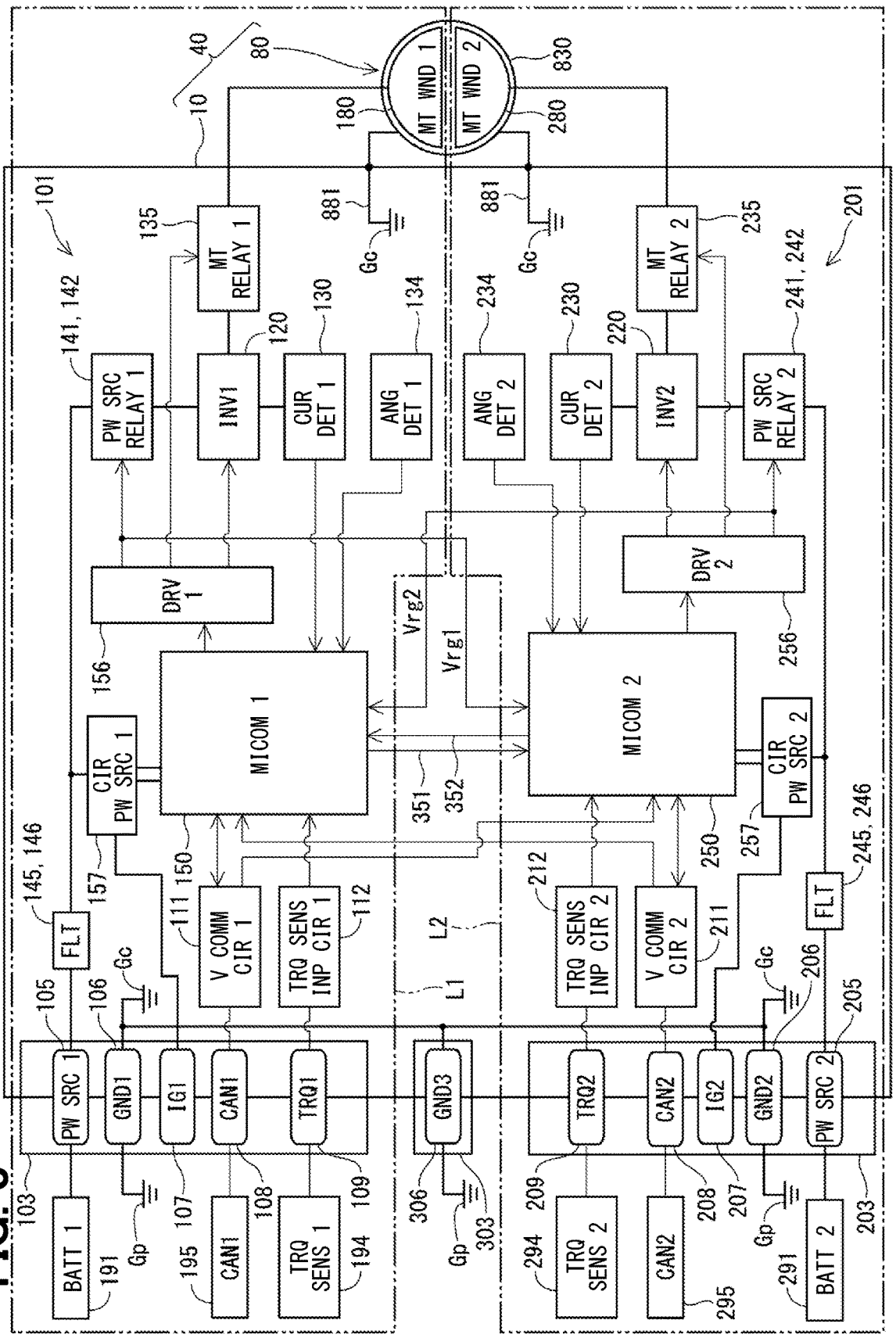
FIG. 3 is a block diagram of the drive device according to the first embodiment.

A coil 145 is provided at a position between the first battery 191 and the power source relay 141. A capacitor 146 has a positive electrode connected to a position between the first battery 191 and the coil 145 and a negative electrode connected to a common ground Gc. The coil 145 and the capacitor 146 constitute a filter circuit to reduce noise transmitted from other devices sharing the first battery 191 to the drive device 40 and to reduce noise transmitted from the drive device 40 to the other devices sharing the first battery 191. In FIG. 3 and the like, the coil 145 and the capacitor 146 are collectively described as "FLT" and numbered "145, 146". A capacitor 147 has a positive electrode connected to a position between the power source relay 142 and the first inverter 120 and a negative electrode connected to the common ground Gc. The capacitor 147 smoothens electric power supplied to the first inverter 120 by storing electric charge.

The second inverter 220 is connected to the second motor winding 280, and electric power is supplied from the second battery 291 via the second inverter 220. The second inverter 220 includes switching elements 221 to 226. A second current detector 230 having current detection elements 231 to 233 is provided on a low-potential side of the second inverter 220. A motor relay unit 235 having motor relays 236 to 238 is provided at a position between the second inverter 220 and the second motor winding 280.

Power source relays 241 and 242 are provided on a high-potential side wiring Lp2 that connects a positive electrode of the second battery 291 and a high-potential side of the second inverter 220. A coil 245 is provided at a position between the second battery 291 and the power relay 241. A capacitor 246 has a positive electrode connected to a position between the second battery 291 and the coil 245 and a negative electrode connected to the common ground Gc. Further, a capacitor 247 has a positive electrode connected to a position between the power relay 242 and the second inverter 220 and a negative electrode connected to the common ground Gc. The details of the functions and the like of each component are the same as those of the first system, thereby, in FIG. 3 and the like, the coil 245 and the capacitor 246 are collectively designated as "FLT," with the reference numbers 245, 246.

As shown in FIG. 3, the ECU 10 includes a first circuit unit 101 and a second circuit unit 201. The first circuit unit 101 includes a first vehicle communication circuit 111, a first torque sensor input circuit 112, the first inverter 120, the first current detector 130, a first angle detection unit 134, the first motor relay unit 135, the first power source relays 141 and 142, the first microcomputer 150, a first driver circuit 156, a first circuit power source 157, and the like. The second circuit unit 201 includes a second vehicle communication circuit 211, a second torque sensor input circuit 212, the second inverter 220, the second current detector 230, a second angle detector 234, the second motor relay unit 235, the second power source relays 241 and 242, the second microcomputer 250, a second driver circuit 256, a second circuit power source 257 and the like.

The ECU 10 is provided with a first connector 103, a second connector 203, and a third connector 303. A first connector 103 is provided with a first power source terminal 105, a first ground terminal 106, a first ignition (IG) terminal 107, a first communication terminal 108, and a first torque terminal 109. The first IG terminal 107, the first communication terminal 108, and the first torque terminal 109 are referred to as a first control terminal 110 (see FIG. 4).

The first power source terminal 105 is connected to the first battery 101 via a fuse (not shown). The electric power supplied from the positive electrode of the first battery 191 via the first power source terminal 105 passes through the filters 145 and 146, the power source relays 141 and 142, the inverter 120, and the motor relay unit 135 to the first motor winding 180. The first ground terminal 106 is connected to the common ground Gc and a ground plane Gp in the ECU 10. The ground plane Gp of the present embodiment is a vehicle body 500 (see FIG. 10).

In the present embodiment, the first ground terminal 106 and the ground plane Gp are connected by a single wire harness. However, according to the current capacity or the like, for example, the first ground terminal 106 and the ground plane Gp may be connected by a plurality of wire harnesses connected in parallel. The same applies to the connection between a second ground terminal 206 and the ground plane Gp, and the connection between a third ground terminal 306 and the ground plane Gp, which is described later.

The first IG terminal 107 is connected to the positive electrode of the first battery 101 via a first switch that is on/off-controlled in conjunction with a vehicle start switch such as an ignition (IG) switch. Electric power or a start signal is supplied from the first battery 191 via the first IG terminal 107 to a first custom IC 155 (see FIG. 7). The first custom IC 135 includes a first driver circuit 156, the first circuit power source 157, a microcomputer monitor (not shown), a current monitor amplifier (not shown), and the like.

The first communication terminal 108 is connected to the first vehicle communication circuit 111 and a first vehicle communication network 195. The first vehicle communication network 195 and the first microcomputer 150 are connected via the first vehicle communication circuit 111 so that transmission/reception is possible. Further, the first vehicle communication network 195 and the second microcomputer 250 are connected so that only reception is possible by the second microcomputer 250, so that, even if the second circuit unit 201 fails, the first vehicle communication network 195 including the first microcomputer 150 will not be affected. Further, either or both of the first microcomputer 150 and the second microcomputer 250 are configured so that a communication line failure can be detected by at least one of the two. Note that reception by the second microcomputer 250 may be performed via a signal line 351. In such case, post-processing information may be transmitted instead of transmitting direct information.

The first torque terminal 109 is connected to the first sensor unit 194 of the torque sensor 94. The detection value of the first sensor unit 194 is input to the first microcomputer 150 via the first torque terminal 109 and the first torque sensor input circuit 112. Here, the first sensor unit 194 and the first microcomputer 150 are configured to detect a failure involving the torque sensor input circuit 112 and the like.

A second connector 203 is provided with the second power source terminal 205, a second ground terminal 206, a second IG terminal 207, a second communication terminal 208, and a second torque terminal 209. The second IG terminal 207, the second communication terminal 208, and the second torque terminal 209 are referred to as a second control terminal 210 (see FIG. 4). The second power source terminal 205 is connected to the positive electrode of the second battery 201 via a fuse (not shown). The electric power from the second battery 291 via the second power source terminal 205 is supplied through the filters 245 and 246, the power source relays 241 and 242, the inverter 220, and the motor relay unit 235 to the second motor winding 280. The second ground terminal 206 is connected to the common ground Gc and to the ground plane Gp in the ECU 10. The ground plane Gp of the present embodiment is a vehicle body 500 (see FIG. 10).

The second IG terminal 207 is connected to the positive electrode of the second battery 201 via a second switch that is on/off-controlled in conjunction with the start switch of the vehicle. Electric power or a start signal is supplied from the second battery 291 via the second IG terminal 207 to the second custom IC 255 (see FIG. 7). The second custom IC 235 includes a second driver circuit 236, a second circuit power source 237, a microcomputer monitor (not shown), a current monitor amplifier (not shown), and the like.

The second communication terminal 208 is connected to the second vehicle communication circuit 211 and to a second vehicle communication network 295. The second vehicle communication network 295 and the second microcomputer 250 are connected via the second vehicle communication circuit 211 so that transmission and reception are possible. Further, the second vehicle communication network 295 and the first microcomputer 150 are connected so that only reception by the first microcomputer 150 is possible, so that, even when the first circuit unit 101 fails, the second vehicle communication network 295 including the second microcomputer 250 will not be affected. Further, either or both of the first microcomputer 150 and the second microcomputer 250 are configured so that a communication line failure can be detected by at least one of the two. Note that reception by the first microcomputer 150 may be performed via a signal line 352 used for communication between microcomputers. In such case, post-processing information may be transmitted instead of transmitting direct information.

The second torque terminal 209 is connected to the second sensor unit 294 of the torque sensor 94. The detection value of the second sensor 294 is input to the second microcomputer 250 via the second torque terminal 209 and the second torque sensor input circuit 212. Here, the second sensor unit 294 and the first microcomputer 150 are configured to be capable of detecting a failure involving the torque sensor input circuit 212 and the like.

In FIG. 3, the communication terminals 108 and 208 are connected to separate (i.e., respectively different) vehicle communication networks 195 and 295, but may also be connected to the same vehicle communication network. Regarding the vehicle communication networks 195 and 295 in FIG. 3, CAN (controller area network) is exemplified. However, the network may be using any other standard such as CAN-FD (CAN with flexible data rate), FlexRay or the like.

The third connector unit 303 is provided with the third ground terminal 306. The third ground terminal 306 is connected to the common ground Gc and to the ground plane Gp in the ECU 10. The ground terminals 106, 206, and 306 are each connected to separate nodes of the vehicle body 500. In other words, three different nodes of the common ground Gc are connected to different nodes in the ground plane Gp via the separate, i.e., independent, connectors 103, 203, and 303, respectively.

The first current detector 130 detects the electric current of the first motor winding 180. The detection value of the first current detector 130 is amplified by an amplifier circuit in the custom IC 155 and is output to the first microcomputer 150. The second current detector 230 detects the electric current of the second motor winding 280. The detection value of the second current detector 230 is amplified by an amplifier circuit in the custom IC 255 and is output to the second microcomputer 250.

The first angle detector 134 detects the rotation angle of the motor 80 and outputs the detection value to the first microcomputer 150. The second angle detector 234 detects the rotation angle of the motor 80 and outputs the detection value to the second microcomputer 250. The first angle detection unit 134 and the first microcomputer 150 are configured to be capable of detecting a failure involving an angle sensor input circuit and the like of the relevant (e.g., subject) system. Further, the second angle detector 234 and the second microcomputer 250 are configured to be capable of detecting a failure involving the angle sensor input circuit and the like in the relevant (e.g., subject) system.

The microcomputers 150 and 250 each include a CPU, a ROM, a RAM, an I/O (not shown), a bus line that connects those components, and the like. Each processing in the microcomputers 150 and 250 may be software processing by executing a program stored in advance in a substantial memory device such as a ROM (that is, a readable, non-transitory, tangible recording medium) by the CPU or may be hardware processing by a dedicated electronic circuit. Here, as the microcomputers 150 and 250, for example, a lock-step dual microcomputer or the like is used, and each of the microcomputers 150 and 250 is capable of detecting a failure of its own.

The first microcomputer 150 controls energization, or power supply, of the first motor winding 180 by controlling the on/off operation of the switching elements 121 to 126. Specifically, according to a control signal output from the first microcomputer 150 to the first driver circuit 156, and a drive signal output from the first driver circuit 156 to each element, the on/off operation of each of the switching elements is controlled. The same applies to the motor relays 136 to 138 and to the power source relays 141 and 142.

The second microcomputer 250 controls energization of the second motor winding 280 by controlling the on/off operation of the switching elements 221 to 226. Specifically, according to the control signal output from the second microcomputer 250 to the second driver circuit 256, and the drive signal output from the second driver circuit 256 to each element, the on/off operation of those elements is controlled. Thereby, the driving of the motor 80 is controlled by the microcomputers 150 and 250. The same applies to the motor relays 236 to 238 and to the power source relays 241 and 242.

The first microcomputer 150 controls the on/off operation of the motor relay 135 and the power source relays 141 and 142. The first microcomputer 150 and the first custom IC 155 monitor abnormality of the first system L1 that is the subject system, and when an abnormality that should stop the subject system occurs, and turn off at least one of the first inverter 120, the first motor relay unit 135, and the first power source relays 141 and 142. Here, the first inverter 120, the first motor relay unit 135, and the first power source relays 141 and 142 are referred to as a "subject system abnormal time stop circuit."

The second microcomputer 250 controls the on/off operation of the motor relay 235 and the power source relays 241 and 242. The second microcomputer 250 and the second custom IC 255 monitor the second system L2 that is the subject system, and when an abnormality that should stop the subject system occurs, turn off at least one of the second inverter 220, the second motor relay unit 235, and Then, at least one of the power source relays 241 and 242. Here, the second inverter 220, the second motor relay unit 235, and the second power source relays 241 and 242 are referred to as a "subject system abnormal time stop circuit."

The first microcomputer 150 monitors at least one of the subject system abnormal time stop circuit that is stopped when an abnormality is detected in the second system L2 and the signal line 352, for the monitoring of the operating state of the second system L2. In the present embodiment, by monitoring the state of the second power source relays 241 and 242 based on a second relay gate signal Vrg2 output from the second driver circuit 256 to the power source relays 241 and 242, whether or not the second system L2 is brought to an emergency stop is monitored.

The second microcomputer 250 monitors at least one of the subject system abnormal time stop circuit and the signal line 351 that is stopped when an abnormality is detected in the first system L1, for the monitoring of the operating state of the first system L1. In the present embodiment, by monitoring the state of the first power source relays 141 and 142 based on a first relay gate signal Vrg1 output from the first driver circuit 156 to the first power source relays 141 and 142, whether or not the first system L1 is brought to an emergency stop is monitored.

Other system monitoring may also be performed based on an intermediate voltage between the two power relay elements, a relay drive signal output from the control unit (i.e., microcomputer), or a voltage after the relay at a position between the power relay and the inverter, based instead on the relay gate signal.

The first microcomputer 150 and the second microcomputer 250 are connected by the signal lines 351 and 352, and can transmit/receive information to/from each other via communication between microcomputers. The signal line 351 has the first microcomputer 150 on an output side and has the second microcomputer 250 on an input side, and the signal line 352 has the second microcomputer 250 on an output side and has the first microcomputer 150 on an input side.

Figure 4:
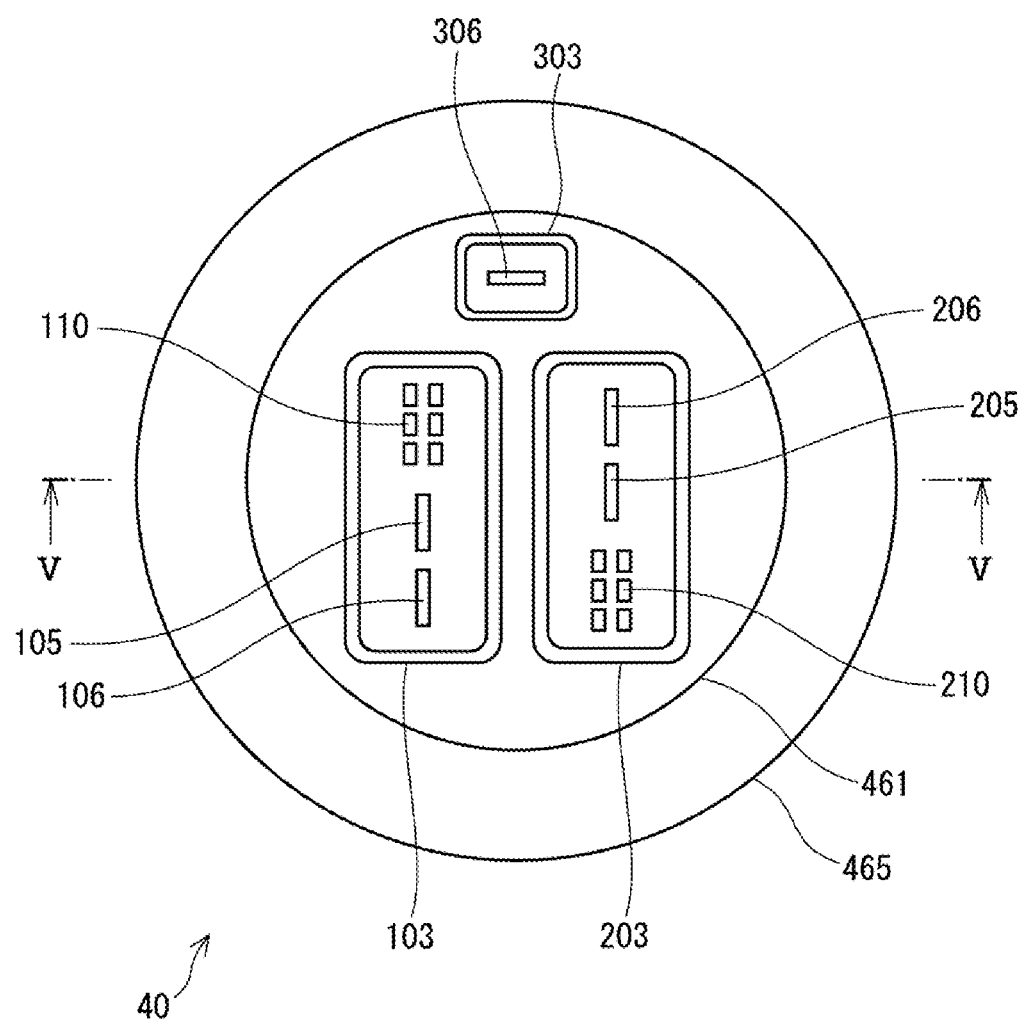
FIG. 4 is a plan view of the drive device according to the first embodiment.
Figure 5:
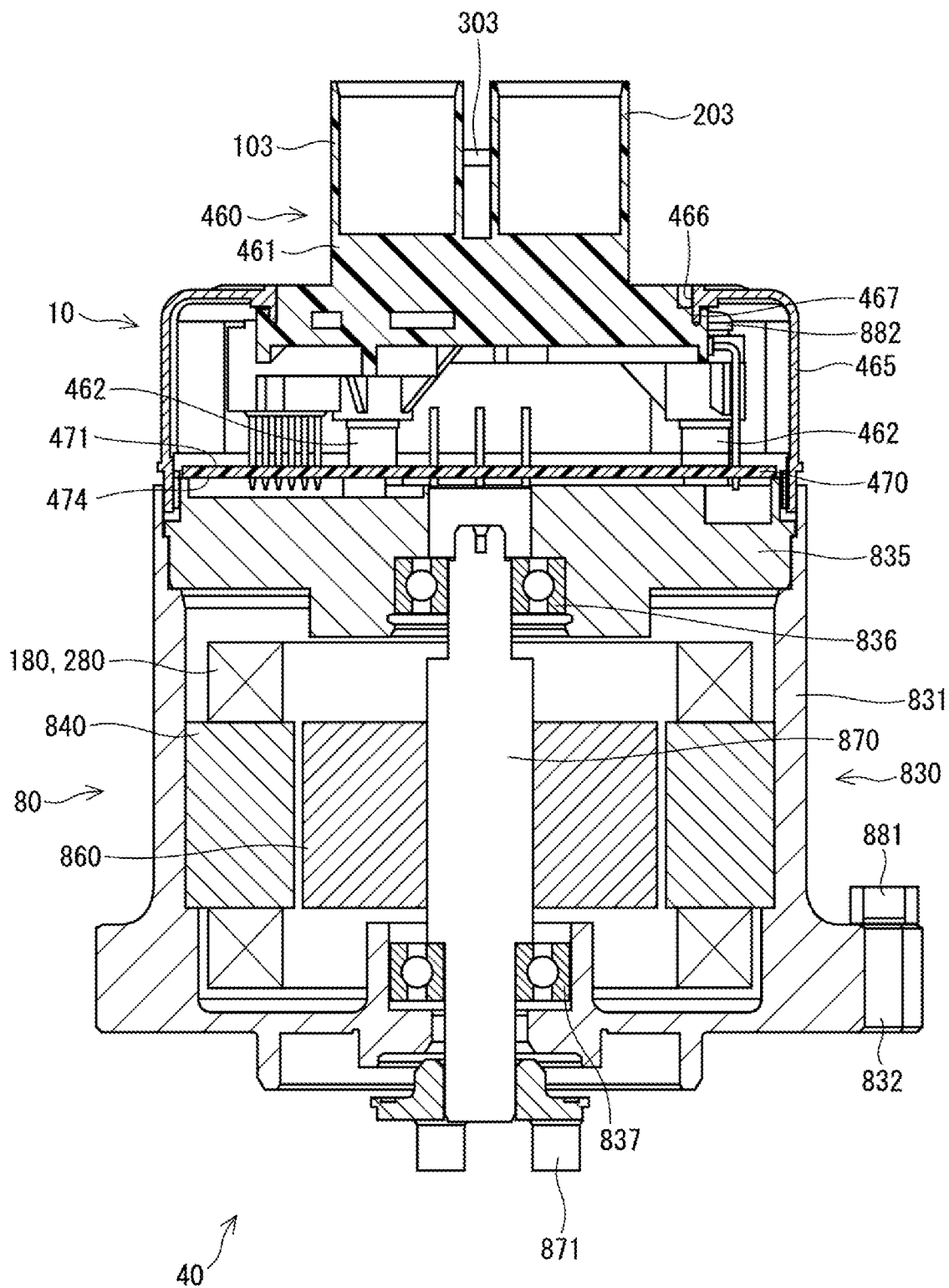
FIG. 5 is a cross-sectional view taken along a line V-V in FIG. 4.

As shown in FIGS. 4 and 5, the drive device 40 is integrally provided with the ECU 10 on one side in the axial direction of the motor 80, which is a so-called "mechanism-electronics integrated type," but the ECU 10 and the motor 80 may also be provided separately from each other. The ECU 10 is positioned coaxially with a shaft 870 on one side opposite to an output shaft of the motor 80. The ECU 10 may alternatively be provided on the output shaft side of the motor 80. By adopting the mechanism-electronics integrated type configuration, it is possible to efficiently arrange the ECU 10 and the motor 80 in a vehicle having restricted mounting space.

The motor 80 includes the stator 840, a rotor 860, a motor case 830 that accommodates those, and the like. The stator 840 is fixed to the motor case 830, and the motor windings 180 and 280 are wound thereon. The rotor 860 is provided radial inside of the stator 840 to be rotatable relative to the stator 840.

The shaft 870 is fitted in the rotor 860 to rotate integrally with the rotor 860. The shaft 870 is rotatably supported by the motor case 830 with bearings 836 and 837. An end of the shaft 870 on an ECU 10 side protrudes from the motor case 830 toward the ECU 10. A magnet (not shown) is provided at the end of the shaft 870 on the ECU 10 side.

The motor case 830 has a bottomed-cylindrical case main body 831 and a rear frame end 835. The case main body 831 is disposed such that a bottom portion is positioned on an output end 871 side and an opening is positioned on the ECU 10 side. The case main body 831 is formed with a plurality of protrusions 832 that protrude radially outward on the bottom side. A hole (not shown) is formed in the protrusions 832, and a fixing member 881 such as a screw is inserted therethrough. The fixing member 881 is screwed into a gear box (not shown) of the speed reduction gear 89. Thereby, the motor case 830 and the gear box are fixed to each other.

The rear frame end 835 is inserted into the opening of the case main body 831 and is press-fitted and fixed. The rear frame end 835 is formed with a motor wire insertion hole (not shown). The motor windings 180 and 280 are inserted into the motor wire insertion hole while being insulated from the rear frame end 835, taken out toward the ECU 10, and connected to the substrate 470.

The ECU 10 includes a connector unit 460, a cover 465, a substrate 470, various electronic components mounted on the substrate 470, and the like. The connector unit 460 includes a connector main body 461 and leg portions 462. The connector main body 461 is provided with the connectors 103, 203, and 303. In FIG. 5, the description of the connector terminals is omitted. The leg portions 462 are formed to extend from the connector main body 461 to the motor 80 side, and comes into contact with the substrate 470. The connector unit 460 is fixed to the rear frame end 835 with the substrate 470 interposed therebetween by a fixing member 882 that is a through bolt inserted through the leg portion 462.

The cover 465 is formed substantially in a bottomed cylindrical shape, and a hole 466 into which the connector main body 461 is inserted is formed at the bottom. On an outer edge of the hole 466, a protrusion 467 inserted into a groove of the connector unit 460 is formed. The cover 465 covers an assembly of the connector unit 460 and the rear frame end 835 from one side opposite to the motor 80, and a tip of the cylindrical portion of the cover 465 is inserted into a gap between the case main body 831 and the rear frame end 835, and the protrusion 467 is inserted into the groove of the connector unit 460 and is fixed by a seal member (not shown) such as an adhesive.

The substrate 470 is a printed circuit board, for example, and is fixed to the rear frame end 835. On the substrate 470, the electronic components of the first and second systems are mounted independently for each system so that the two systems are provided in a fully redundant configuration. According to the present embodiment, the electronic components are mounted on one substrate 470. However, the electronic components may alternatively be mounted on plural substrates.

Figure 6:
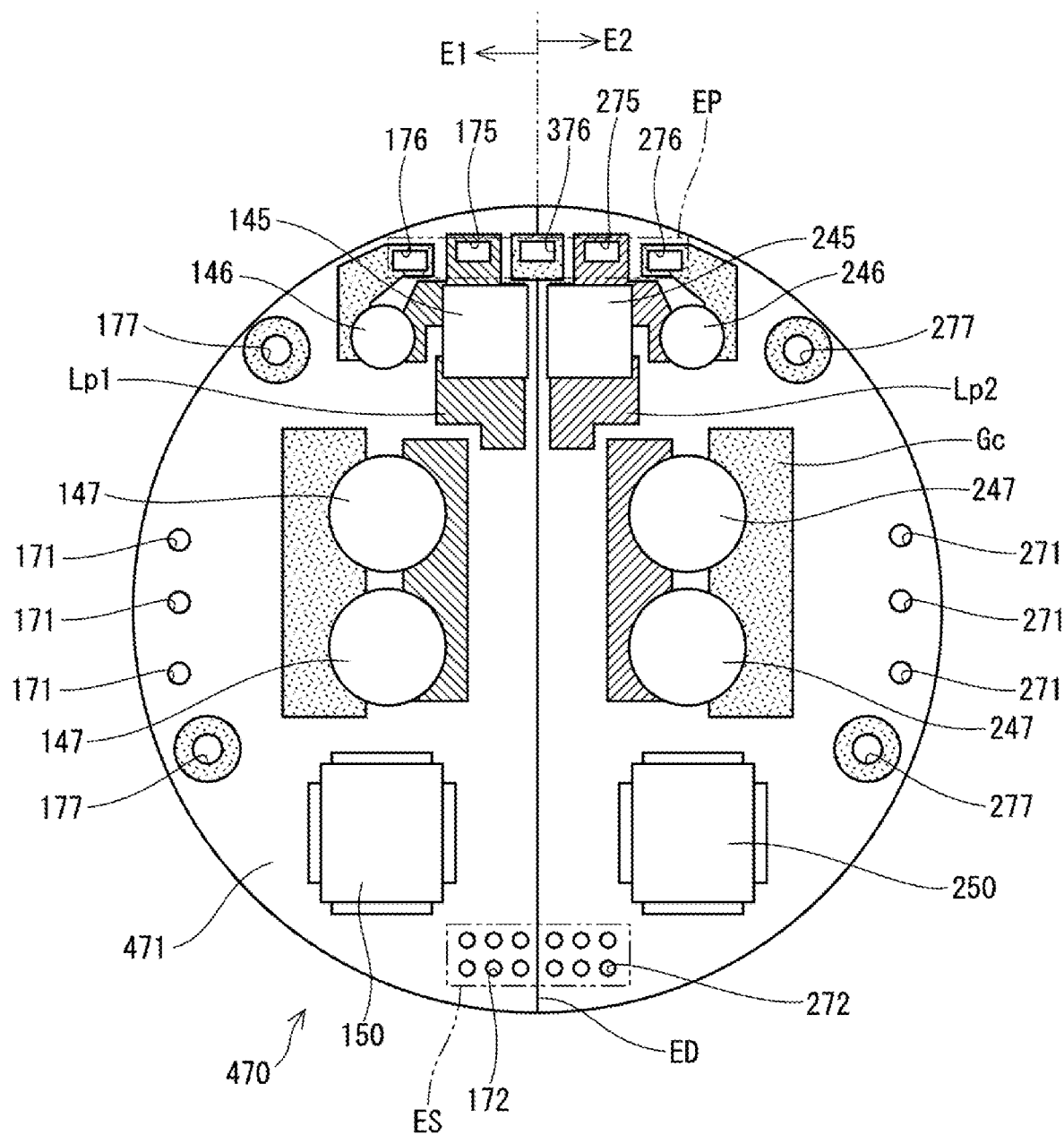
FIG. 6 is a schematic view of a cover surface of a substrate according to the first embodiment.
Figure 7:
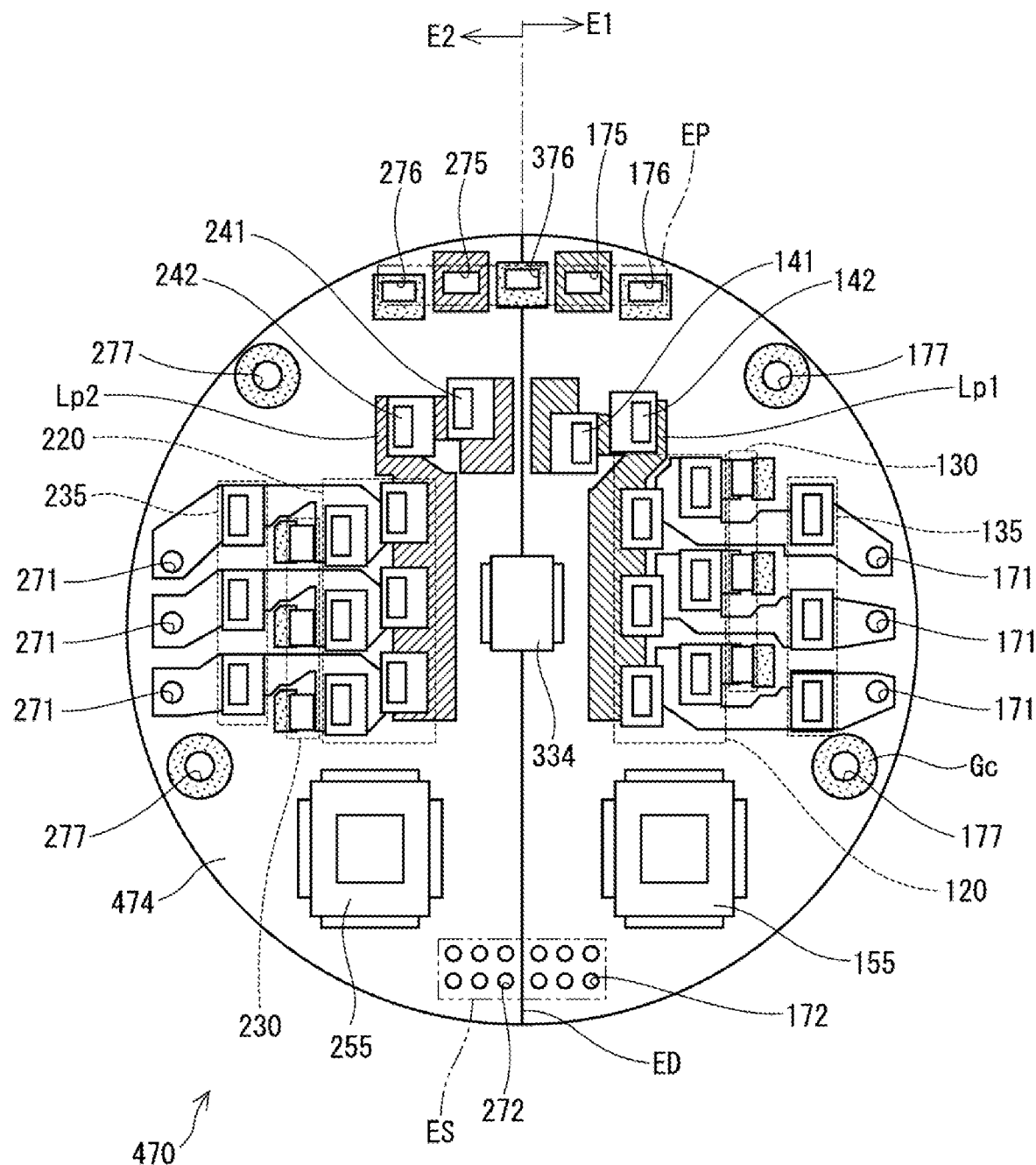
FIG. 7 is a schematic view of a motor surface of the substrate according to the first embodiment.
Figure 8:
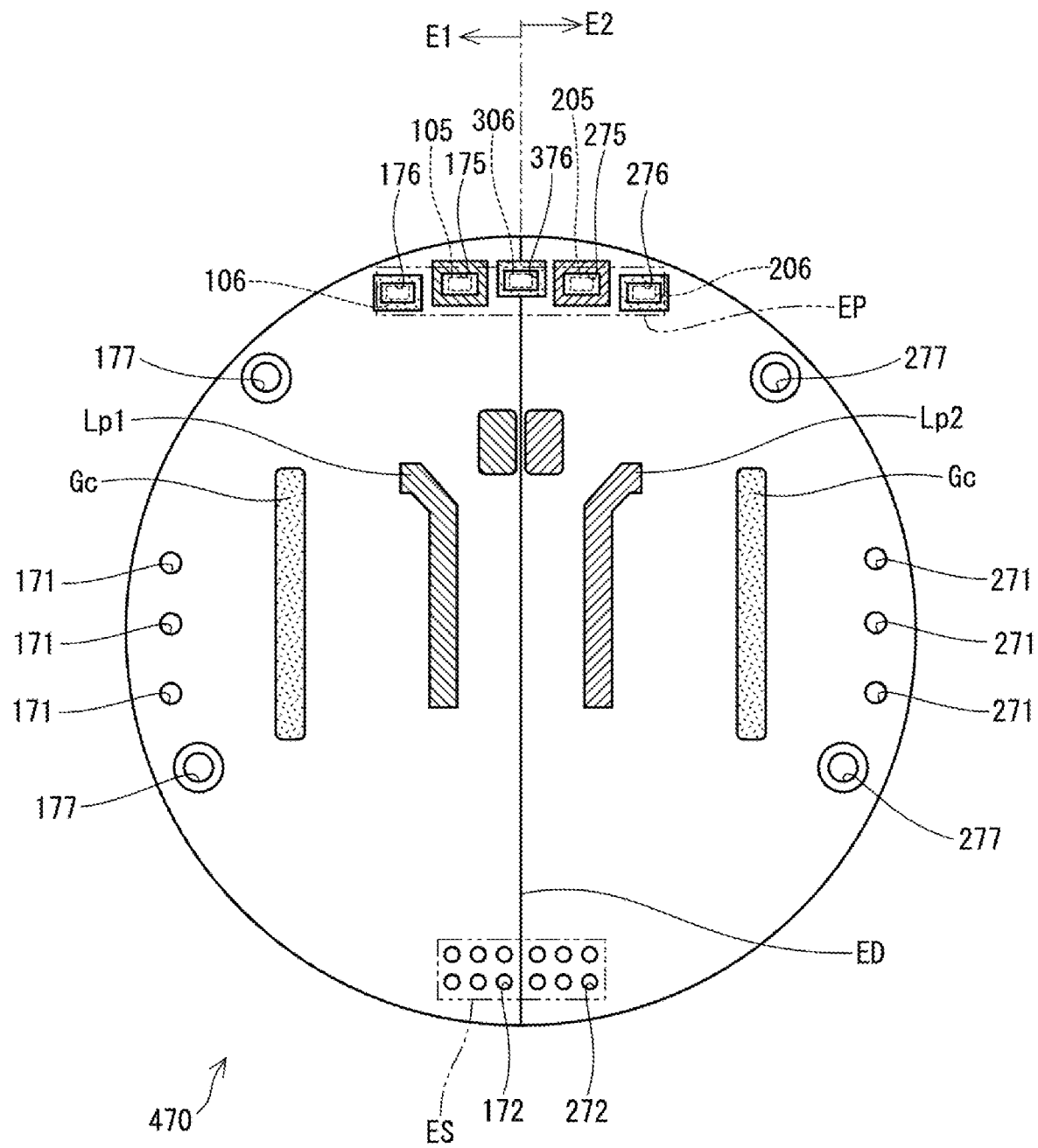
FIG. 8 is a schematic view of a second layer of the substrate according to the first embodiment.
Figure 9:
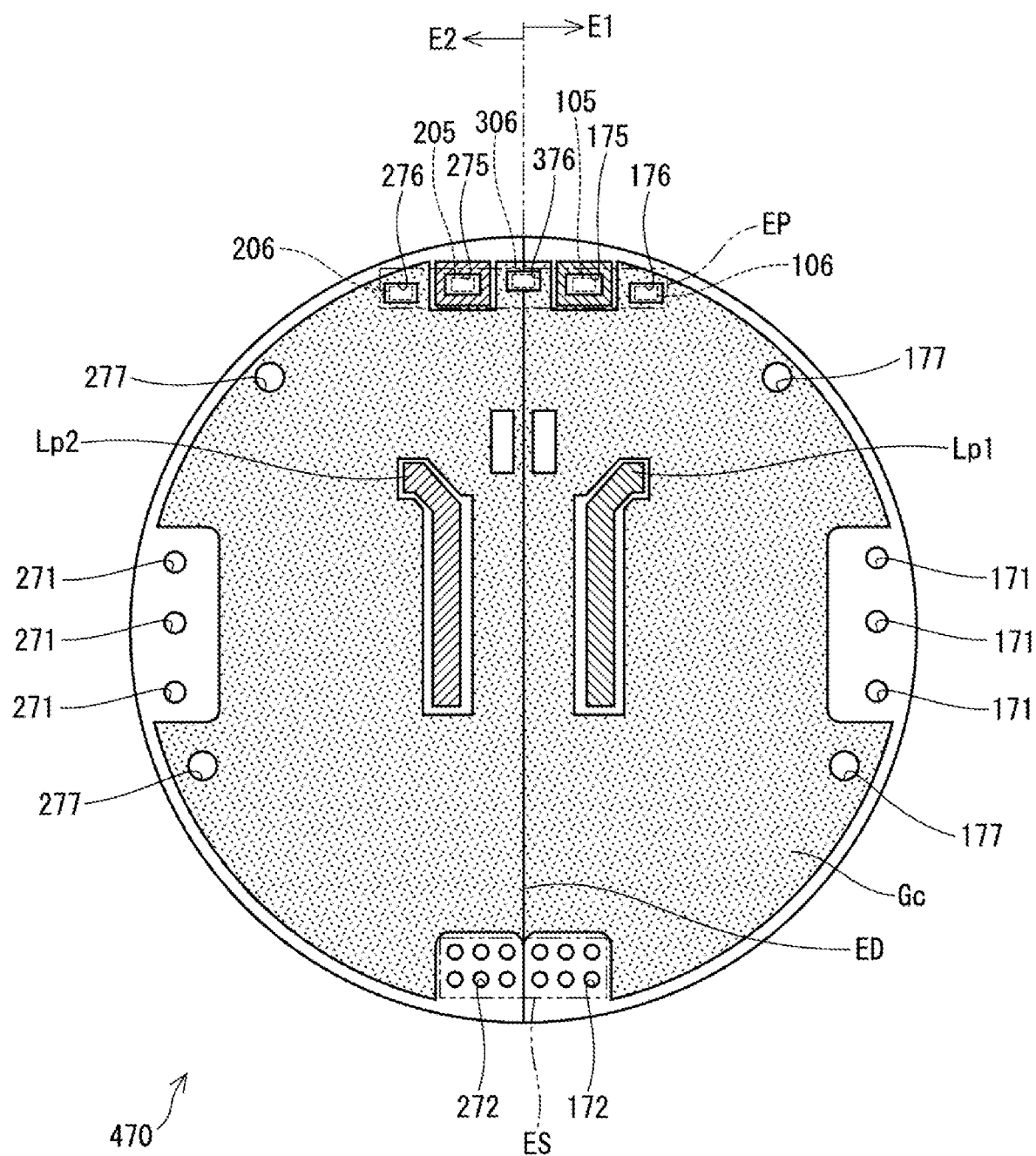
FIG. 9 is a schematic view of a third layer of the substrate according to the first embodiment.

In the present embodiment, the substrate 470 is a four-layer substrate, and, from among two main surfaces, the main surface opposite to the motor 80 is a cover surface 471 and the main surface on the motor 80 side is a motor surface 474. Further, the cover surface 471 side layer is the first layer, the motor surface 474 side layer is the fourth layer, and a second layer 472 and a third layer 473 are provided therebetween. The cover surface 471 is shown in FIG. 6, the motor surface 474 is shown in FIG. 7, the second layer 472 is shown in FIG. 8, and the third layer 473 is shown in FIG. 9. The cover surface 471 in FIG. 6 and the second layer 472 in FIG. 8 are seen from the side opposite to the motor 80, and the left side of the drawing is a first system region E1, and the right side of the drawing is a second system region E2. The motor surface 474 in FIG. 7 and the third layer 473 in FIG. 9 are seen from the motor 80 side, and the right side of the drawing is the first system region E1, and the left side of the drawing is the second system region E2.

The components of the first system L1 are mounted in the first system region E1, and the components of the second system L2 are mounted in the second system region E2. In FIGS. 6 to 9, the common ground pattern Gc is indicated by matte, and the wiring patterns corresponding to the high-potential side wirings Lp1 and Lp2 are indicated by hatching. In addition, in order to avoid complication, description of some components, signal wiring, etc. is omitted.

As shown in FIG. 6, the coils 145 and 245, the capacitors 146, 147, 246 and 247, and the microcomputers 150 and 250 are mounted on the cover surface 471. In the present embodiment, the capacitors 147 and 247 are disposed at positions near the center of each system region, the coils 145 and 245 and the capacitors 146 and 246 are positioned on one side of the capacitors 147 and 247, and microcomputers 150 and 250 are positioned on the other side thereof.

As shown in FIG. 7, the inverters 120 and 220, the current detectors 130 and 230, the motor relays 135 and 235, the power source relays 141, 142, 241 and 241, and the custom ICs 155 and 255 are mounted on the motor surface 474. In addition, in order to avoid complication, the numbers for the elements are omitted.

The inverters 120 and 220 are mounted approximately on the back side of the capacitors 147 and 247, and the custom ICs 155 and 255 are mounted approximately on the back side of the microcomputers 150 and 250. Further, from a region dividing line ED side toward the outer edge of the substrate 470, the switching elements 121 to 123, 221 to 223 on the high-potential side, the switching elements 124 to 126, 224 to 226 on the low potential side, the current detection elements 131 to 133, 231 to 233, the motor relays 136 to 138, and 236 to 238 are positioned in the written order. Further, the power source relays 141 and 142 are positioned on the opposite side of the custom ICs 155 and 255, which are the high-potential side elements of the inverters 120 and 220.

A rotation angle sensor 334 is mounted at a position substantially at the center of the motor surface 474 and facing the shaft 870. The rotation angle sensor 334 is mounted across the region dividing line ED. The rotation angle sensor 334 includes angle detectors 134 and 234 in an electrically independent state inside thereof. In FIG. 7, the angle detectors 134 and 234 are provided in one package, but the detectors 134 and 234 may be separately packaged.

In the present embodiment, a region along the outer edge of the substrate 470, which is on the outside of a component region where various electronic components are mounted is designated as an outer region. As shown in FIGS. 6 to 9, motor line connecting portions 171 and 271 are respectively formed in the outer regions on both sides of the region dividing line ED interposed therebetween, substantially parallel to the region dividing line ED. The motor windings 180 and 280 are connected to the motor line connecting portions 171 and 271, respectively, i.e., phase to phase.

A control terminal connection region ES is provided across the first system region E1 and the second system region E2 in the outer region on one surface having the microcomputers 150 and 250 and the custom ICs 155 and 255 disposed thereon. In the control terminal connection region ES, a first control terminal connection portion 172 is provided in the first system region E1, and a second control terminal connection portion 272 is provided in the second system region E2. The first control terminal 110 is connected to the first control terminal connection portion 172. The second control terminal 210 is connected to the second control terminal connection portion 272.

A power terminal connection region EP is an outer region opposite to the control terminal connection region ES with respect to the center of the substrate, and outside the coils 145 and 245 and the capacitors 146 and 246, across the first system region E1 and the second system region E2. In the power terminal connection region EP, a first power source terminal connection portion 175 and a first ground terminal connection portion 176 are formed in the first system region E1, and a second power source terminal connection portion 275 and a second ground terminal connection portion 276 are formed in the second system region E2. Further, in the power terminal connection region EP, a third ground terminal connection portion 376 is formed across the first system region E1 and the second system region E2. The first power source terminal 105 is connected to the first power source terminal connection portion 175, and the first ground terminal 106 is connected to the first ground terminal connection portion 176, and the second power source terminal 205 is connected to the second power source terminal connection portion 275, and the second ground terminal 206 is connected to the second ground terminal connection portion 276, and the third ground terminal 306 is connected to the third ground terminal connection portion 376. For the ease of understanding, the power source terminal and the ground terminal are indicated by broken lines in FIGS. 8 and 9.

In the present embodiment, the first system L1 and the second system L2 are connected to the common ground Gc. Therefore, as shown in FIG. 9, it is not necessary to separate the ground pattern for each system, and the common ground Gc can be formed in a single pattern across the first system region E1 and the second system region E2.

Housing connection portions 177 and 277 are formed on the substrate 470. In the present embodiment, there are two case connection portions 177 and two case connection portions 277, but the number of case connection portions 177 and 277 is arbitrary, and the number may be different for system to system. A fixing member 882 (see FIG. 5) such as a screw is inserted through the housing connection portions 177 and 277, and the substrate 470 is fixed to the rear frame end 835 by the fixing member 882. In the present embodiment, the common ground Gc is exposed along the outer edges of the case connection portions 177 and 277 on the cover surface 471 and the motor surface 474. Here, by using a conductive member as the fixing member 882, the common ground Gc and the motor case 830 are electrically connected. Thereby, the noise which leaks to the outside of the drive device 40 can be reduced.

Figure 15:
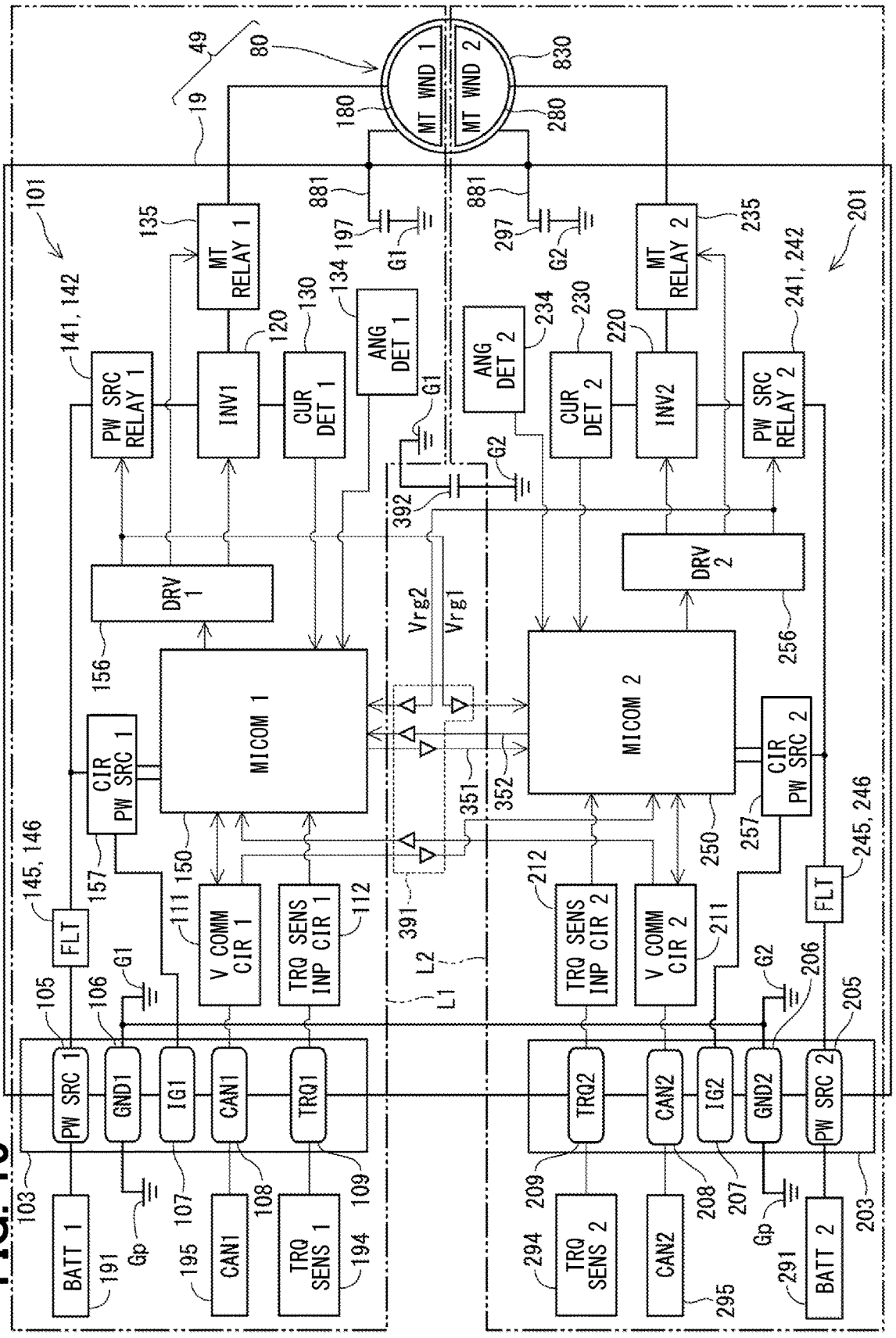
FIG. 15 is a block diagram of the drive device according to a reference example.
Figure 16:
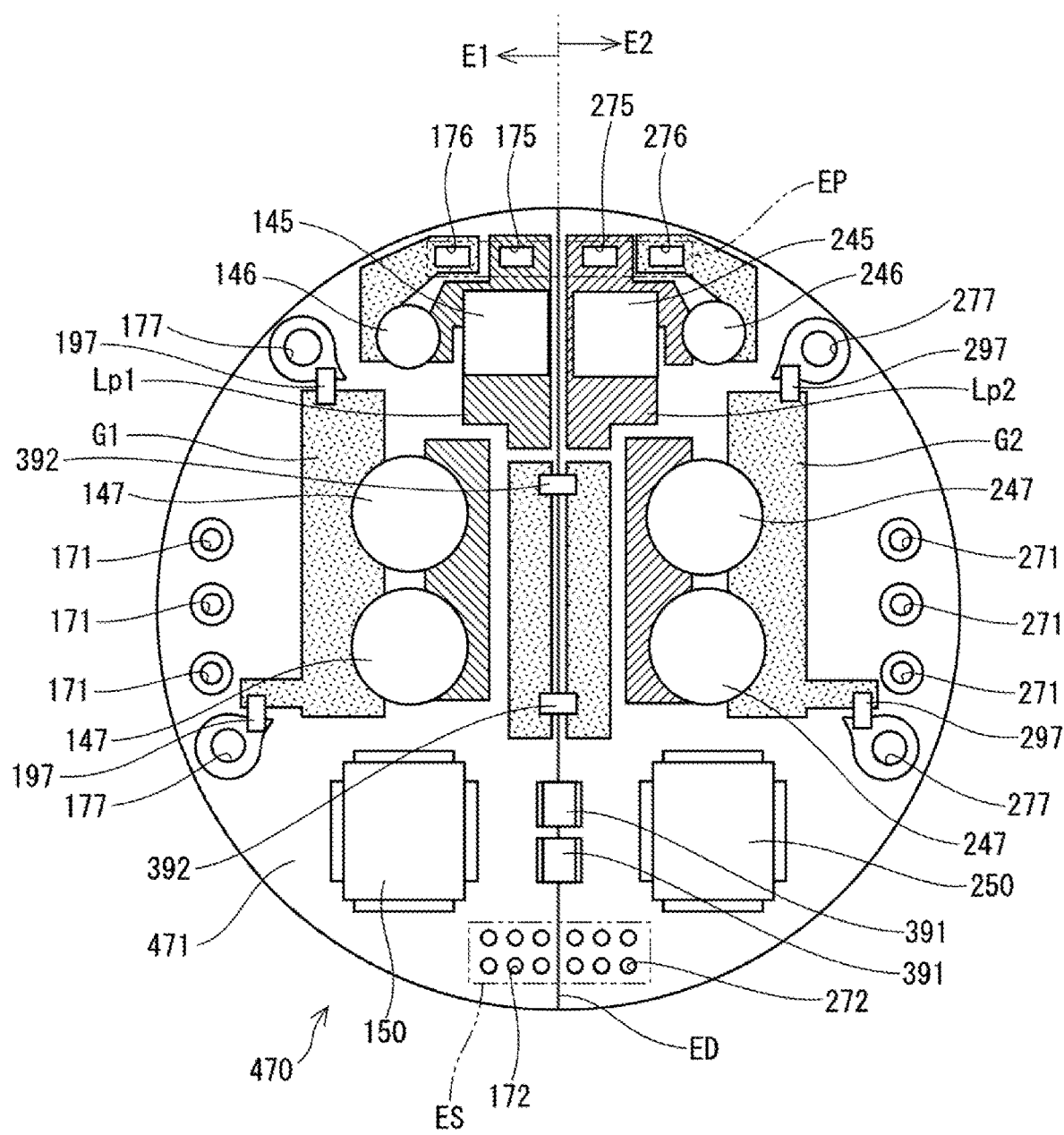
FIG. 16 is a schematic view of the cover surface of the substrate according to the reference example.
Figure 17:
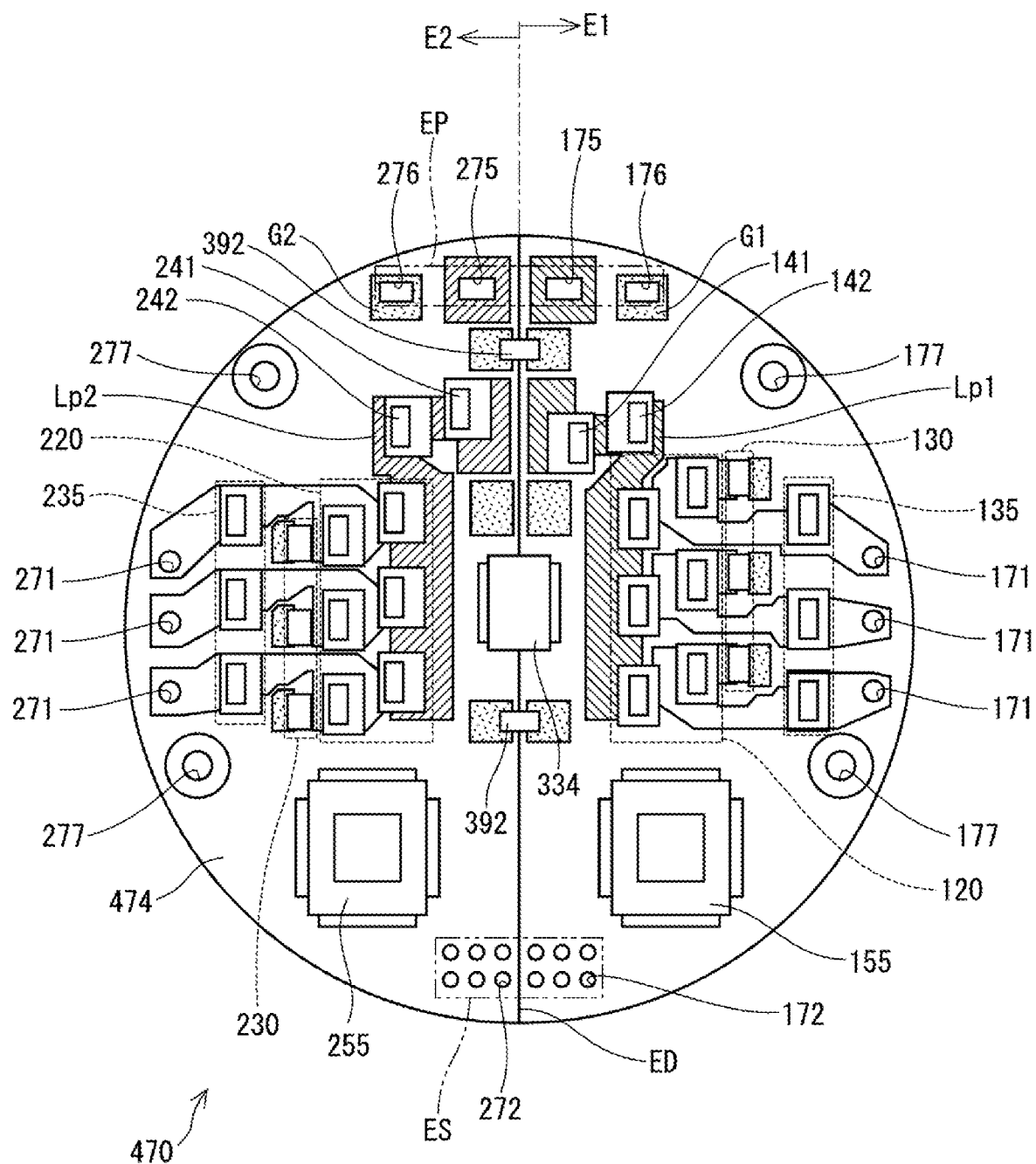
FIG. 17 is a schematic diagram of the motor surface of the substrate according to the reference example.
Figure 18:
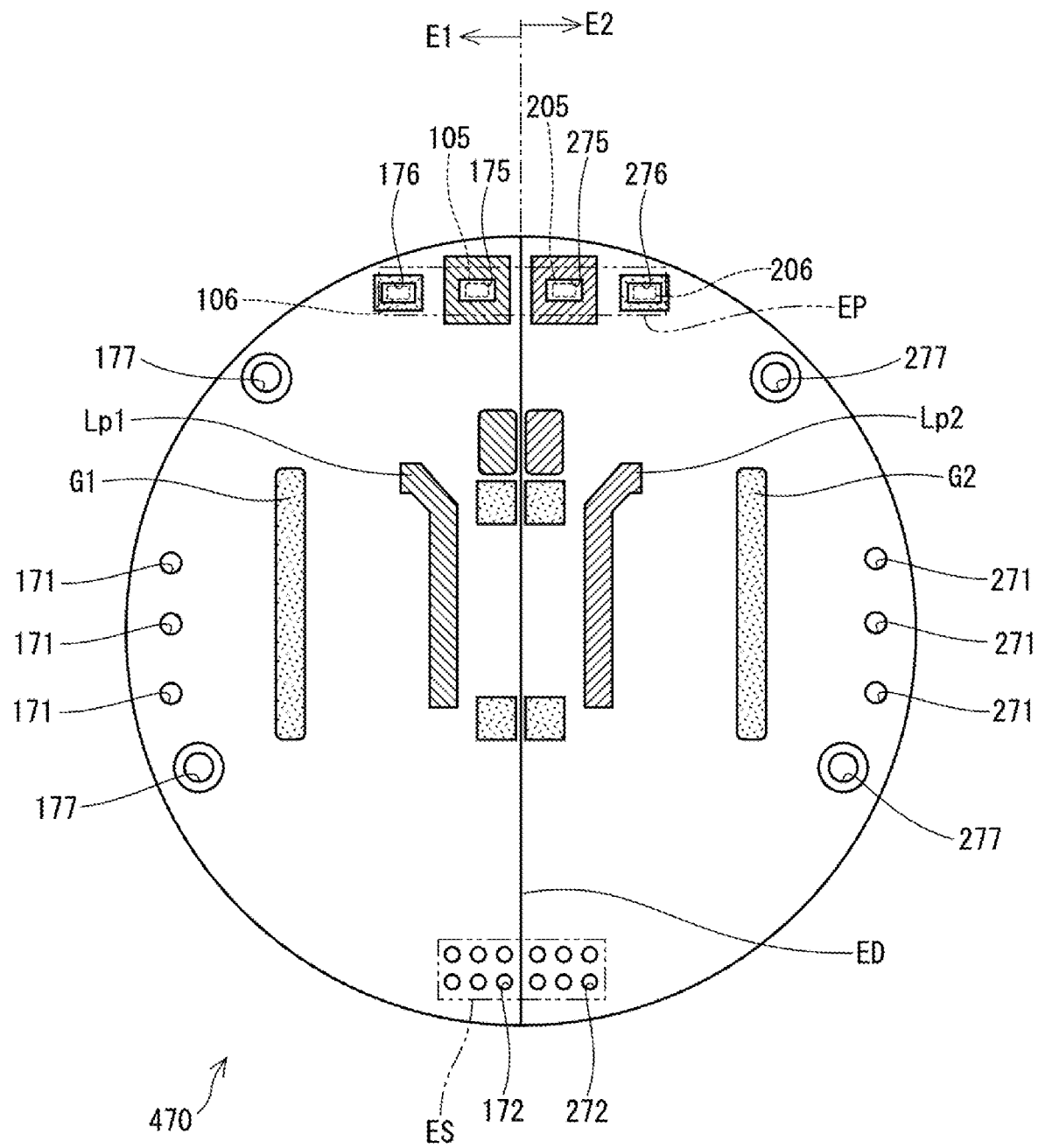
FIG. 18 is a schematic diagram of a second layer of the substrate according to the reference example.
Figure 19:
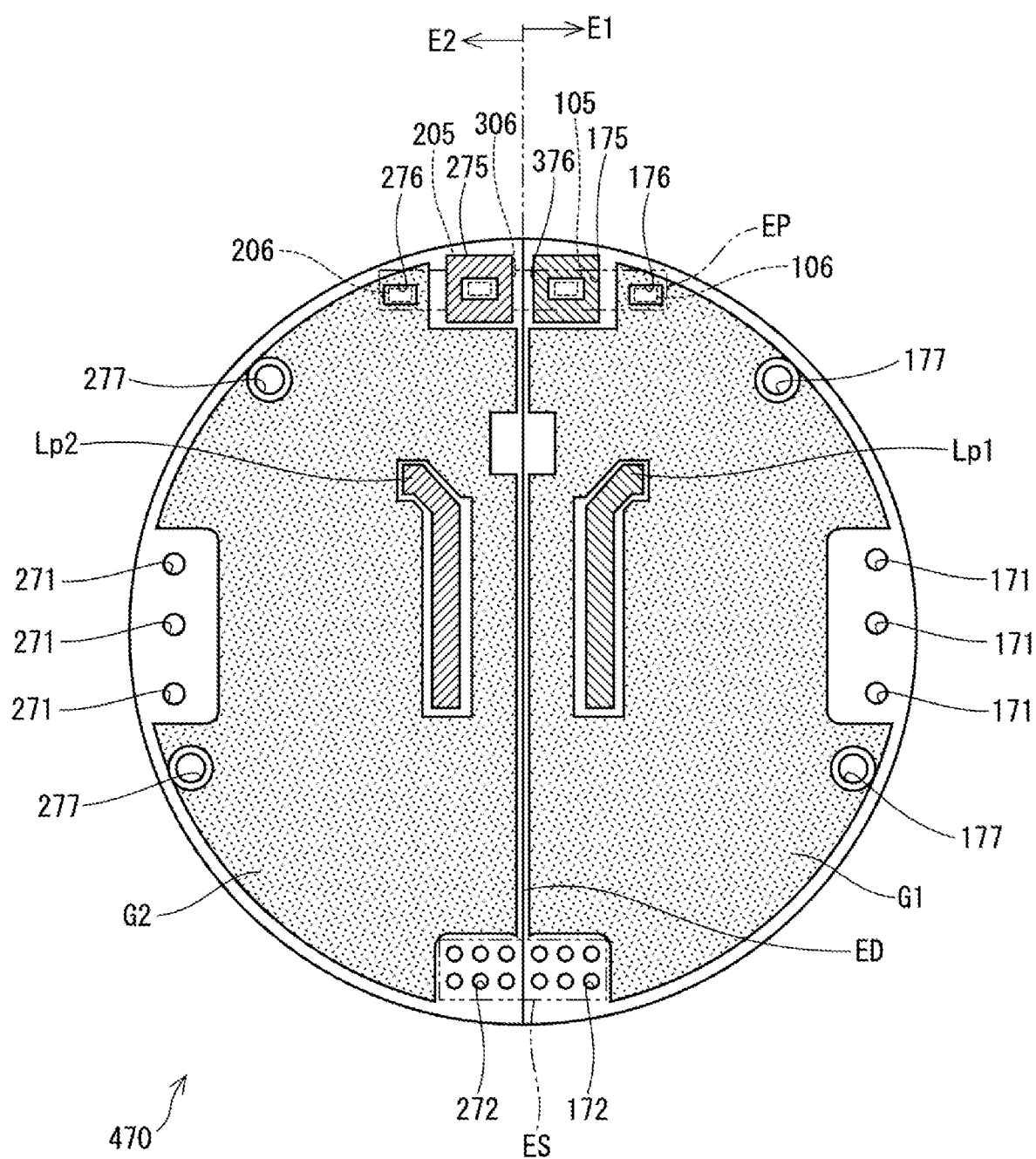
FIG. 19 is a schematic diagram of a third layer of the substrate according to the reference example.

Here, reference examples in which the ground is separated for each system are shown in FIGS. 15 to 19. FIG. 15 is a block diagram corresponding to FIG. 3, and FIGS. 16 to 19 correspond to FIGS. 6 to 9, among which FIG. 16 shows the cover surface 471, FIG. 17 shows the motor surface 474, FIG. 18 shows the second layer 472 and FIG. 19 shows the third layer 473.

When the first system ground G1 and the second system ground G2 are separated as in an ECU 19 of a drive device 49 according to the reference example, if there is a difference of the ground potential between the systems due to ground floating or ground disconnection, there is a possibility that a circuit component failure or the like may occur due to a sneak current via the signal lines 351 and 352. Therefore, it is necessary to provide a circuit for detecting a ground abnormality, an inter-system communication interface circuit 391 such as a photocoupler for reducing a sneak current, and the like. In addition, components such as an inter-system connection capacitor 392 and housing ground connection capacitors 197 and 297 may additionally be required to prevent emission high-frequency electromagnetic noise generated by the mutual inductance and line capacitance of the motor windings 180 and 280, which may lead to the increase of the number of components and/or to restrictions on the substrate mounting surface.

Figure 10:
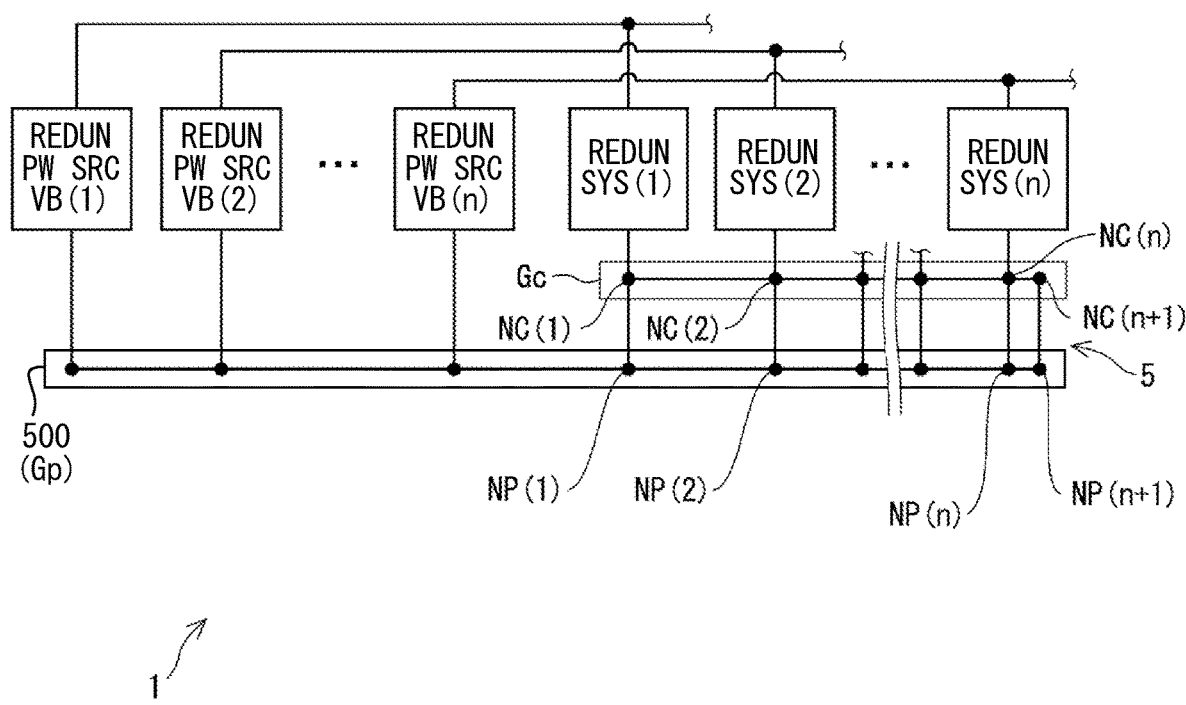
FIG. 10 is a schematic diagram of a power source system according to the first embodiment.
Figure 11:
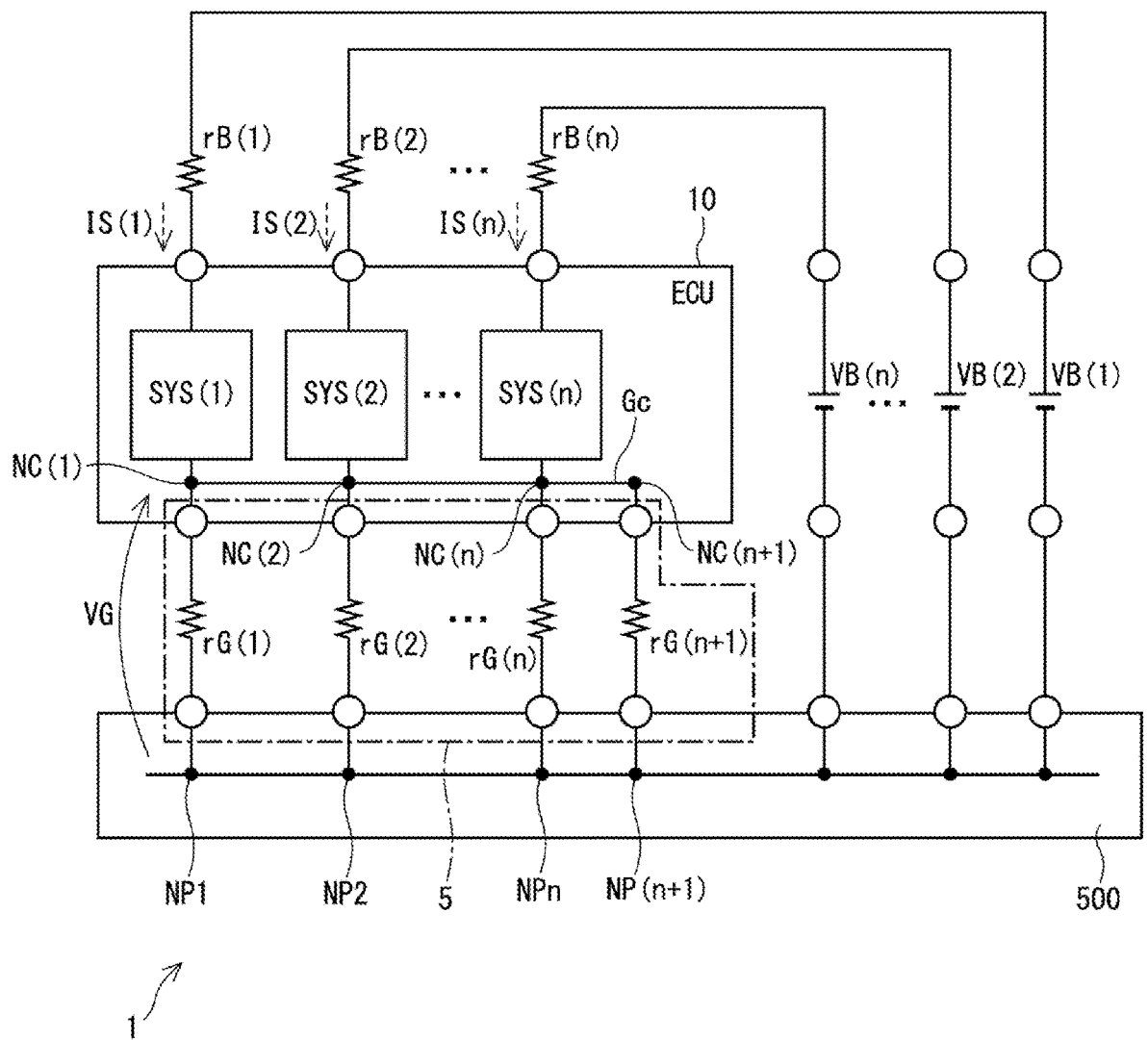
FIG. 11 is an explanatory diagram of wiring resistance of the power source system according to the first embodiment.

Therefore, in the present embodiment, all the systems are connected to the common ground Gc in the ECU 10, and a redundant ground is provided by connecting the common ground Gc and the ground plane Gp with node connections between the number of nodes greater than the number of systems of the power sources. FIGS. 10 and 11 are diagrams schematically showing a redundant system with system number of n. Redundant power sources VB(1) to VB(n) in n systems are connected to n or more systems of redundant circuits SYS(1) to SYS(n). Subscripts "(1)" to "(n)" indicate system numbers, where n is an integer of 2 or more. When a power source system 1 is applied to the electric power steering device 8, where n=2, the redundant circuits SYS(1) to SYS(n) correspond to the circuit units 101 and 201, and the redundant power sources VB(1) to VB(n) corresponds to the batteries 191, 291. In other words, the electric power steering device 8 is a redundant system with n=2.

The redundant circuits SYS(1) to SYS(n) are respectively a circuit having functional redundancy in terms of functional safety. Functional redundancy means that the circuit configuration and performance may be different among the redundant circuits, as long as a minimum functional safety redundancy function is provided. All the redundant circuits SYS(1) to SYS(n) are connected to the common ground Gc. Further, the common ground Gc and the vehicle body 500 serving as a ground plane are connected by a ground wiring portion 5 that independently connects (n+α) nodes. The node "+α" may be regarded as a "redundant node."

Specifically, nodes NC(1) to NC(n+α) in the common ground Gc and nodes NP(1) to NP(n+α) on the vehicle body 500 that is the ground plane are connected by independent wirings. α is an integer equal to or greater than 1, and here, α is assumed to be 1. By connecting the common ground Gc and the vehicle body 500 with (n+α) independent wirings, the operation can be continued even when multipoint failures up to (α+1) points have occurred.

FIG. 11 shows resistances rB(1) to rB(n) of the power source line and resistances rG(1) to rG(n+1) of the redundant ground wiring. The resistances rB(1) to rB(n) and rG(1) to rG(n+1) are wiring resistances, and include contact resistances and wiring harness resistances of wiring system connectors and terminals. Further, the resistances rB(1) to rB(n) include the ground plane resistance and the negative electrode resistance of the battery.

When designating the number of redundant systems as n, the number of functional safety guaranteeable multipoint failures as m, the minimum operating voltage required for an operation of each of the systems as VS#safe, the minimum operating current required for each of the systems at such time as IS#safe, and the guaranteed minimum battery voltage as VB#safe, the wiring resistance is set to satisfy an equation (1). Here, # is 1 to n, and m<n. The term VGsafe in the equation (1) is a potential of the common ground Gc with respect to the potential of the vehicle body 500 that is a ground plane.

$$VGsafe = VB\#safe - VS\#safe - (rB\# \times IS\#safe) \quad (1)$$

As for the ground wiring, it is the worst case that all failures concentrate on the ground wiring portion 5, thus, for the avoidance of which, as a total of the remaining operating currents IS#safe when the (n−m) systems remain operating, a common ground potential VGsafe is set to be equal to or lower than a minimum voltage VGsafe_min. Here, when the wiring resistance is designated in a descending order as rG(1), rG(2), . . . rG(n), rG(n+1), top (n−m) pieces of parallel resistance values rGsafe are respectively set to be equal to or lower than a value, represented by an equation (2). In an actual circuit, in addition to the above, other considerations such as the degree of reliability of the terminal connection and/or the wire harness, the short circuit of each of the redundant system circuits are taken into account, for the continuation of the normal operation even with other failures.

$$rGsafe = VGsafe\_min / \Sigma IS\#safe \quad (2)$$

As described above, the power source system 1 of the present embodiment includes the n or more systems of the circuit units 101 and 201, the common ground Gc, and the ground wiring portion 5. The circuit units 101 and 201 are connected to each of the n systems of the batteries 191 and 291, respectively (where n is an integer of 2 or more). The common ground Gc is connected to all the circuit units 101 and 201 in common. The ground wiring portion 5 connects the (n+α) pieces of the common ground nodes NC(1) to NC(n+α) provided in the common ground Gc and the (n+α) pieces of the ground plane nodes NP(1) to NP(n+α) provided in the vehicle body 500 in an independent manner, i.e., node to node by one-to-one connection. In such manner, redundant circuits that can withstand multipoint failures is providable with a simple configuration without separating the ground for each system.

The common ground Gc and the vehicle body 500 are connected via the connectors 103, 203, and 303. Thereby, the common ground Gc and the vehicle body 500 can be appropriately connected. Further, the connectors 103, 203, and 303 are provided independently for each of the nodes. Thereby, even when one connector is disconnected, the connection between the common ground Gc and the vehicle body 500 can be maintained by other connector(s).

When designating the number of multipoint failures that guarantee functional safety as m (where m<n), the parallel resistance value rGsafe between the vehicle body 500 and the common ground Gc is set based on the total of the minimum operating currents IS#safe of the (n−m) systems and the minimum value of the common ground potential VGsafe. In such manner, even when multipoint failures concentrate on the ground wiring portion 5, the operation can be continued.

Second Embodiment

Figure 12:
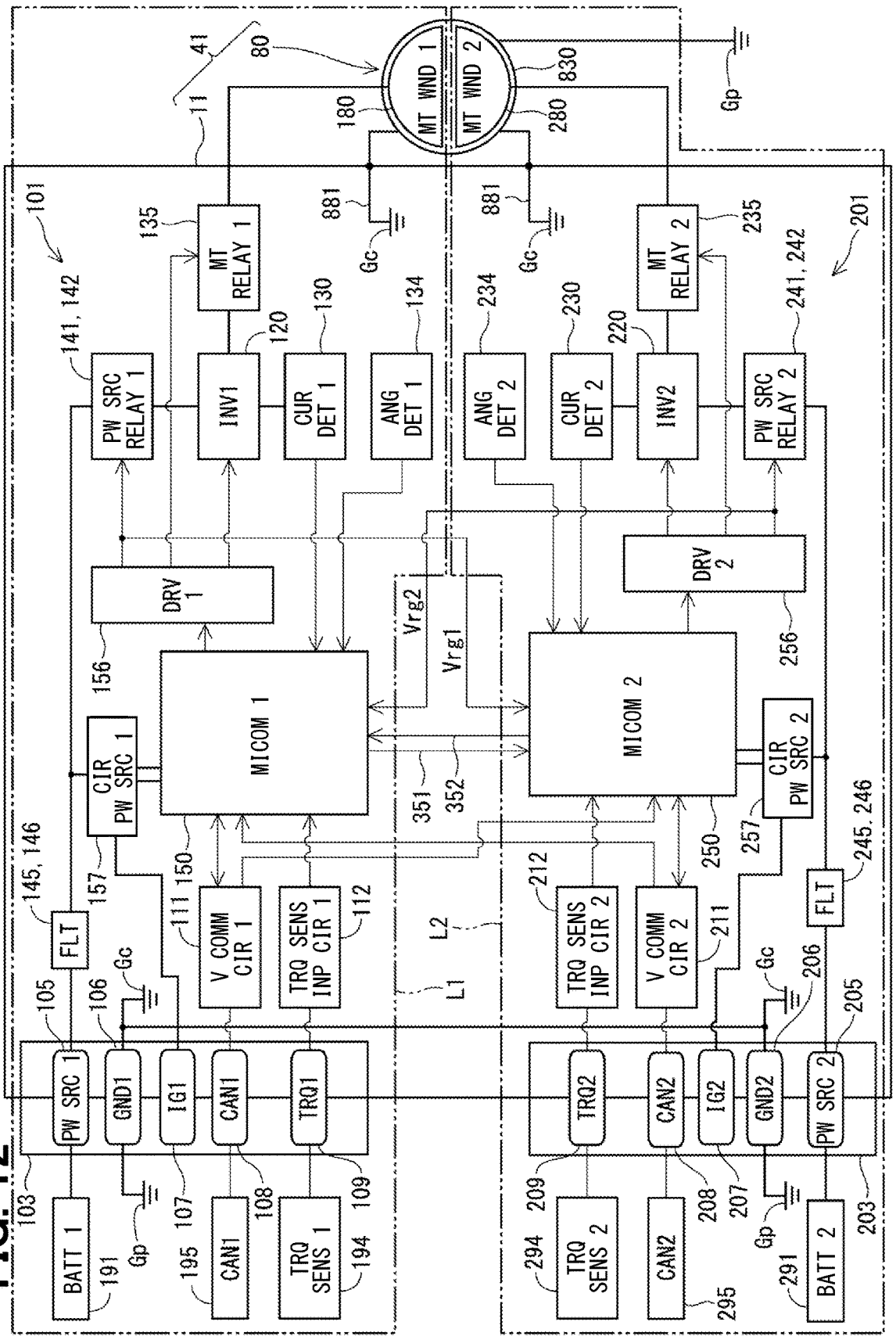
FIG. 12 is a block diagram of a drive device according to a second embodiment.
Figure 13:
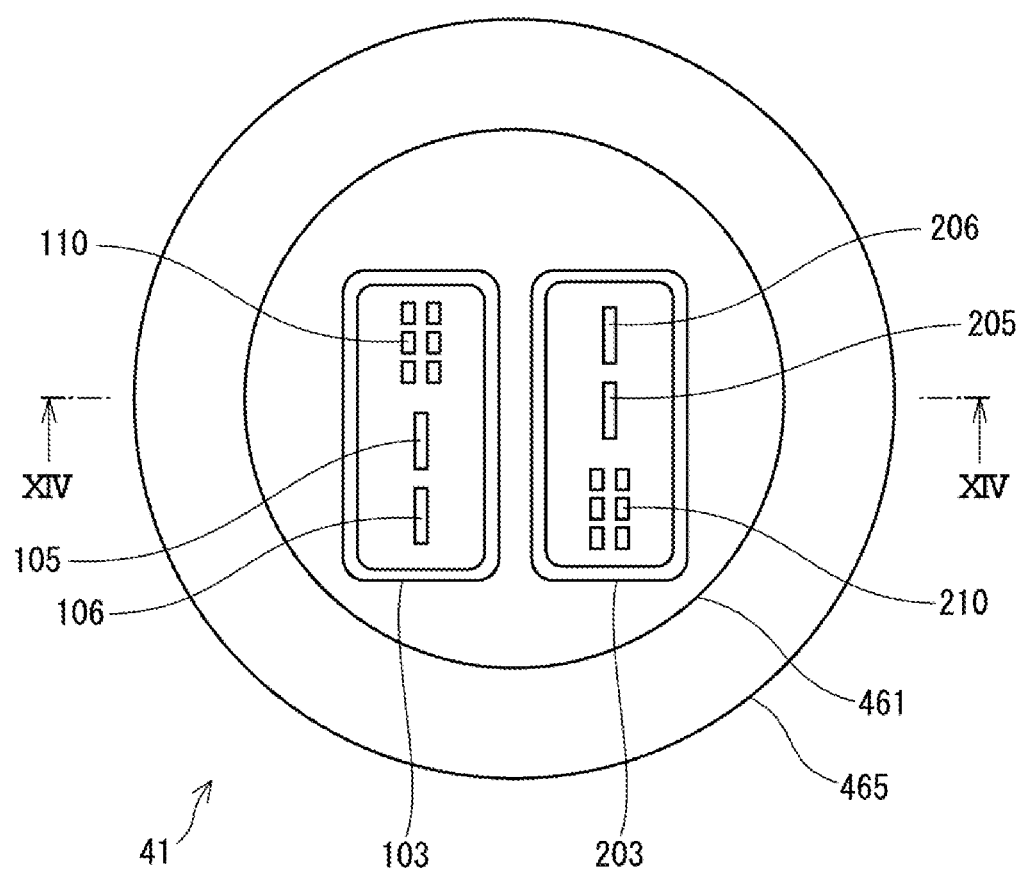
FIG. 13 is a plan view of the drive device according to the second embodiment.
Figure 14:
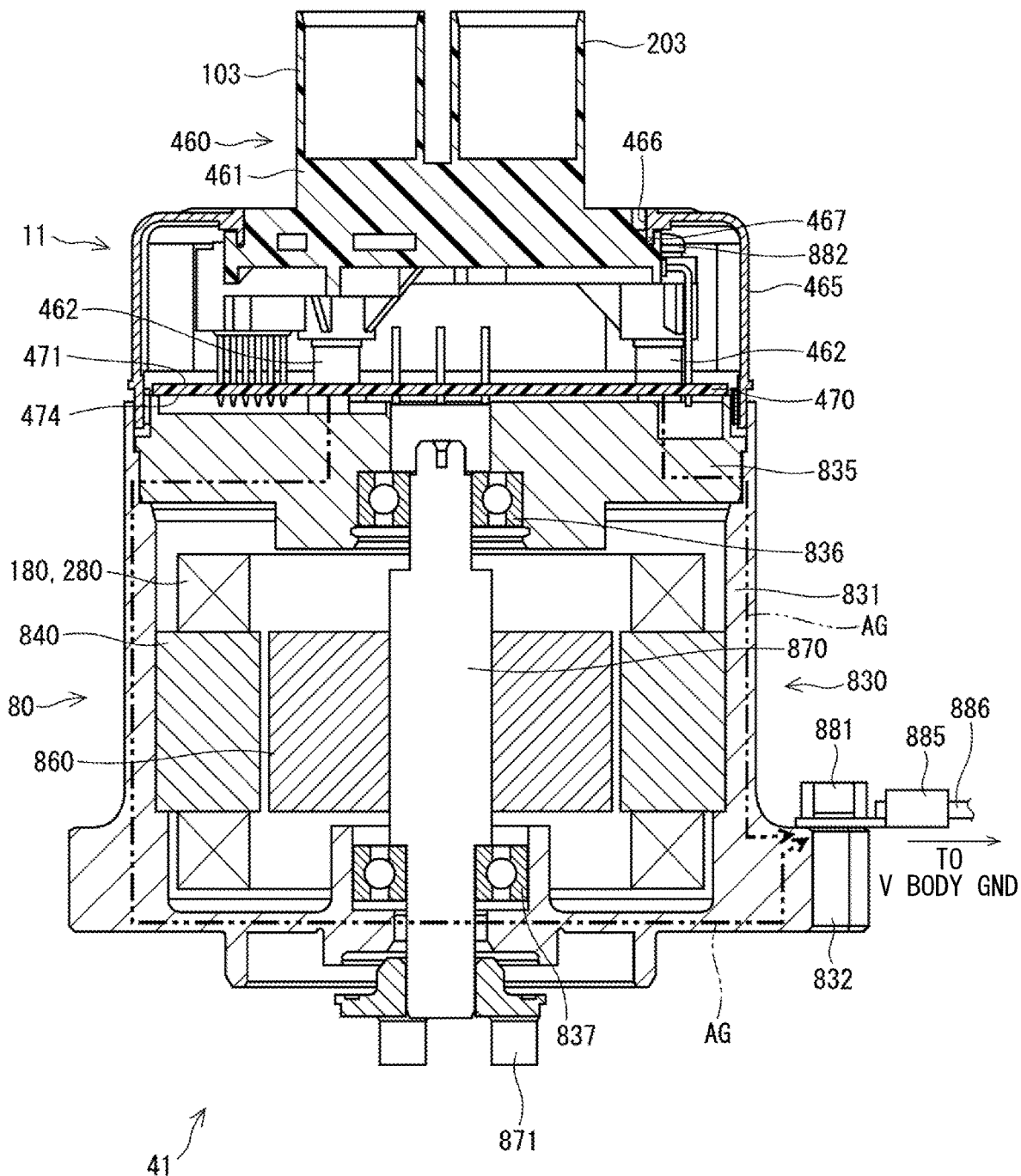
FIG. 14 is a cross-sectional view taken along a line XIV-XIV in FIG. 13.

The second embodiment is shown in FIG. 12 to FIG. 14. In the above embodiment, connectors are provided by the number of systems+α, and the common ground Gc and the vehicle body 500 are connected via independent, i.e., respectively different, connectors. As shown in FIGS. 12 and 13, in an ECU 11 of a drive device 41 of the present embodiment, the number of connectors is 2, and the third connector 303 of the above embodiment is omitted. Instead, in the present embodiment, the redundant ground is provided by electrically connecting the motor case 830 and the vehicle body 500.

Specifically, as shown in FIG. 14, a connection member 885 is sandwiched between the protrusion 832 and the fixing member 881, and a harness 886 electrically connected to the connection member 885 is connected to the vehicle body 500 by a ground plane node NP3 which is a node different from ground plane nodes NP1 and NP2 connected to the ground terminals 106 and 206. In such manner, as indicated by an arrow AG, the common ground Gc of the substrate 470 passes through the fixing member 882, the rear frame end 835, the case main body 831, the fixing member 881, the connection member 885, and the harness 886 to be connected to the vehicle body 500. In the present embodiment, the case main body 831 is connected to the vehicle body 500 via the harness 886. However, the case main body 831 may be connected to the vehicle body 500 via a gear box, which is part of the speed reduction gear 89 to which the case main body 831 is coupled.

In the present embodiment, at least one common ground node is connected to the ground plane Gp via the motor case 830 that is a housing that holds the circuit units 101 and 201. Thereby, the number of connectors can be reduced. Further, the present embodiment also provides the same advantages as those of the above-described embodiment.

Other Embodiments

In the first embodiment, the common ground node and the ground plane node are connected via separate connectors. In other embodiments, a plurality of terminals that connect the common ground node and the ground plane node may be provided in one connector. Further, the common ground node and the ground plane node may be directly connected by wiring such as a wire harness without going through a connector.

In the second embodiment, the common ground and the ground plane are connected via the motor case. In other embodiments, the common ground and the ground plane may be connected via a case on the ECU side instead of the motor case. In other embodiments, the ECU may be provided independently from a control object such as a motor, and the common ground and the ground plane may be connected via a case of the ECU. In such case, the case that accommodates the circuit unit corresponds to a "housing." In the above embodiments, the ground plane is the vehicle body. In other embodiments, the ground plane may be other than the vehicle body.

In the above embodiments, the number n of systems is 2 in the electric power steering apparatus. In other embodiments, the number of systems n may be 3 or more. Also, a plurality of parts for each system may be provided, such as providing a plurality of inverters and winding sets for one control unit. One set of motor windings may be provided for a plurality of inverters. In the above embodiment, the number of redundant nodes α is 1. In other embodiments, a may be 2 or more according to the number of systems and the number of multipoint failures that guarantee functional safety.

In the above embodiment, the redundant power source is always supplied to each redundant circuit. Normally, however, only the main power source is connected to each redundant circuit, and only when a main power source abnormality is detected, the redundant power source is switched. In addition, for each redundant system, the number of redundant power sources is reduced, and when a power failure occurs in one system, the power source of the abnormal system is disconnected and various power source systems are used. In addition, the present disclosure is applicable.

In the above embodiments, the power source system is applied to an electric power steering device. In other embodiments, the power source system may be applied to an in-vehicle device other than the electric power steering device/system, or a device other than the in-vehicle device. The present disclosure is not limited to the above embodiments, and various modifications may be implemented without departing from the spirit of the present disclosure.

What is claimed is:

1. A power source system for an electric power steering device of a vehicle, the electric power steering device comprising a motor and an electronic control unit (ECU) for controlling the motor, the power source system comprising:
    a plurality of circuit systems configured to control and operate the motor, the plurality of circuit systems positioned within the ECU, wherein a number of the plurality of circuit systems is equal to n, in which n is an integer of two or more;
    a plurality of power sources connected to the plurality of circuit systems;
    a common ground to which all of the plurality of circuit systems are connected in common, the common ground located in the ECU and comprising a plurality of common ground nodes, wherein a number of the plurality of common ground nodes is equal to n+α, where α is a number of redundant nodes and comprises an integer of 1 or more;
    a ground plane to which all of the plurality of circuit systems are connected, the ground plane located external of the ECU and comprising a plurality of ground plane nodes, wherein a number of the plurality of ground plane nodes is equal to n+α; and
    a plurality of ground wiring portions configured to provide node-to-node connection between a common ground node and a ground plane node of a corresponding circuit system.

2. The power source system according to claim 1, wherein the common ground and the ground plane are connected via a connector.

3. The power source system according to claim 2, wherein the connector comprises a plurality of connectors, and
    at least one connector of the plurality of connectors is provided independently for each of the common ground and the ground plane.

4. The power source system according to claim 1, wherein at least one of the plurality of common ground nodes is connected to the ground plane via a housing that accommodates the ECU.

5. The power source system according to claim 1, wherein when designating a maximum number of multipoint failures that guarantee functional safety is m (where m<n), a parallel resistance value between the ground plane and the common ground is set based on a total of minimum operating circuit systems (n−m) and a minimum value of a common ground potential.

* * * * *